United States Patent
Ji et al.

(10) Patent No.: US 11,444,816 B2
(45) Date of Patent: Sep. 13, 2022

(54) SIGNAL SENDING METHOD AND APPARATUS AND SIGNAL RECEIVING METHOD AND APPARATUS

(71) Applicant: HUAWEI TECHNOLOGIES CO., LTD., Guangdong (CN)

(72) Inventors: Tong Ji, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/787,749

(22) Filed: Feb. 11, 2020

(65) Prior Publication Data
US 2020/0177431 A1 Jun. 4, 2020

Related U.S. Application Data

(63) Continuation of application No. PCT/CN2017/097266, filed on Aug. 11, 2017.

(51) Int. Cl.
*H04L 27/26* (2006.01)

(52) U.S. Cl.
CPC ...... *H04L 27/2663* (2013.01); *H04L 27/2675* (2013.01)

(58) Field of Classification Search
CPC .. H04J 11/0073; H04J 13/0062; H04J 13/102; H04L 27/2663
See application file for complete search history.

(56) References Cited

U.S. PATENT DOCUMENTS

| 2010/0039998 A1* | 2/2010 | Imamura ................. H04L 23/02 370/329 |
| 2014/0003476 A1 | 1/2014 | Xu et al. |
| 2016/0373222 A1* | 12/2016 | Pralea ................. H04L 27/2636 |

(Continued)

FOREIGN PATENT DOCUMENTS

| CN | 102857996 A | 1/2013 |
| CN | 103095627 A | 5/2013 |

(Continued)

OTHER PUBLICATIONS

LG Electronics, "NB-IoT Synchronization Signal Design ",3GPP Draft, R1-161485,24, XP051079401,Feb. 15-19, 2016, 11 pages.

(Continued)

*Primary Examiner* — Ayaz R Sheikh
*Assistant Examiner* — Debebe A Asefa
(74) *Attorney, Agent, or Firm* — Fish & Richardson P.C.

(57) ABSTRACT

Embodiments of the present invention disclose a signal sending method and apparatus and a signal receiving method and apparatus. The signal sending method includes: generating, by a network device, a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1; and sending, by the network device, the first signal to a terminal device.

18 Claims, 14 Drawing Sheets

(56) References Cited

U.S. PATENT DOCUMENTS

2018/0062884 A1    3/2018  Li et al.
2020/0036430 A1*   1/2020  Kim ..................... H04W 24/10

FOREIGN PATENT DOCUMENTS

| CN | 103516640 A | 1/2014 |
| CN | 104935545 A | 9/2015 |
| CN | 106101043 A | 11/2016 |
| CN | 106160787 A | 11/2016 |
| CN | 106161299 A | 11/2016 |
| WO | 2016078303 A1 | 5/2016 |
| WO | 2017136003 A1 | 8/2017 |

OTHER PUBLICATIONS

Extended European Search Report issued in European Application No. 17921339.2 dated May 20, 2020, 13 pages.

PCT International Search Report and Written Opinion in International Application No. PCT/CN2017/097,266, dated Apr. 28, 2018, 15 pages (With English Translation).

Office Action issued in Chinese Application No. 201780093454.X dated Sep. 1, 2020, 15 pages (with English translation).

* cited by examiner

SIGNAL SENDING METHOD AND APPARATUS AND SIGNAL RECEIVING METHOD AND APPARATUS

CROSS-REFERENCE TO RELATED APPLICATIONS

This application is a continuation of International Application No. PCT/CN2017/097266, filed on Aug. 11, 2017, the disclosure of which is hereby incorporated by reference in its entirety.

TECHNICAL FIELD

The present invention relates to the field of communications technologies, and in particular, to a signal sending method and apparatus and a signal receiving method and apparatus.

BACKGROUND

In a communications system that requires low costs, coverage enhancement, and the like, such as narrowband interact of things (Narrow Band Internet of Things, NB-IoT), when a terminal performs downlink synchronization processing, a problem of a large crystal oscillator error (usually caused by low costs) is usually faced. The large crystal oscillator error means that a receiving signal has a comparatively large carrier frequency offset relative to a sending signal. For a sequence in the signal, the carrier frequency offset in frequency domain causes a continuous phase change of the sequence in time domain. The phase change in time domain may degrade or even damage a correlation characteristic of the sequence. Once the correlation characteristic of the sequence is degraded or even damaged, a correlation peak may disappear and a timing position cannot be determined during correlation processing performed by a receive end. The correlation processing means that the receive end performs a convolution operation on a received sequence and a local sequence, and the local sequence is a sequence without being affected by a channel or noise.

For example, as shown in FIG. 1a, a primary synchronization signal in long term evolution (Long Term Evolution, LTE) uses a ZC (Zadoff-Chu) sequence with a root index of 25, 29, or 34 and with a length of 63. The ZC sequence is a sequence with a good autocorrelation characteristic and is usually used as a synchronization sequence. If a sequence design manner (that is, a ZC sequence) in LTE is directly used in the NB-IoT system, anti-frequency offset performance is comparatively poor. As shown in FIG. 1b, if the sequence has no frequency offset (in other words, a receiving sequence of a receive end has no frequency offset relative to a sending sequence), when the receive end performs correlation processing, a correlation peak is comparatively obvious. As shown in FIG. 1c, if the sequence has a frequency offset (in other words, a receiving sequence of a receive end has a frequency offset relative to a sending sequence), for example, the frequency offset is 18 kHz, when the receive end performs correlation processing, a correlation peak completely disappears.

SUMMARY

Embodiments of the present invention provide a signal sending method and apparatus and a signal receiving method and apparatus, to resist a frequency offset and accurately determine a timing position.

According to a first aspect, an embodiment of the present invention provides a signal sending method, where the signal sending method includes: generating, by a network device, a first signal, where the first signal includes at least one sequence pair, and one sequence pair includes two sequences. Optionally, the sequences in the first signal are sorted according to an order of time domain symbols that carry the sequences in the first signal. The two sequences in the sequence pair may be adjacent sequences or non-adjacent sequences. For example, two sequences separated by S sequences form one sequence pair, where S is a natural number greater than or equal to 1. Optionally, one or more time domain symbols carry one sequence.

Optionally, one sequence may simultaneously exist in two sequence pairs. For example, any two adjacent sequences form one sequence pair, or one sequence exists only in one sequence pair.

For two sequences in any of the at least one sequence pair, the two sequences meet the following condition: An element value of one sequence is a value obtained by calculating, according to a first calculation rule, an element value of the other sequence of the two sequences and an element value of a first sequence corresponding to the other sequence. For example, one sequence in the sequence pair is a sequence C, the other sequence is a sequence A, and a first sequence corresponding to the other sequence is a sequence B. A quantity of elements in the sequence A, a quantity of elements in the sequence B, and a quantity of elements in the sequence C are the same. It is assumed that $c_i$ is a value of an element whose index value is i in the sequence C, $a_i$ is a value of an element whose index value is i in the sequence A, and $b_i$ is a value of an element whose index value is i in the sequence B, the value $c_i$ is a value obtained by calculating the value $a_i$ and the value $b_i$ according to the first calculation rule.

The first sequence corresponding to the other sequence indicates that the first sequence is strongly correlated with the other sequence in the sequence pair. For example, if the other sequence is A, a first sequence corresponding to the other sequence is A1; or if the other sequence is B, a first sequence corresponding to the other sequence is B1.

Each of the at least one sequence pair and the first sequence are complex sequences with lengths greater than 1.

The network device sends the first signal to a terminal device, and the terminal device receives the first signal. The first signal may be a signal affected by undesirable factors such as a channel, noise, and a carrier frequency offset (frequency offset for short). The terminal device may calculate two sequences in each sequence pair according to a target calculation rule, to obtain a third sequence corresponding to the other sequence in the sequence pair. The third sequence may be a sequence obtained after the first sequence is affected by the undesirable factors such as the channel, the noise, and the carrier frequency offset (frequency offset for short), and therefore the third sequence still retains a characteristic of the first sequence. The terminal device may perform correlation processing by using the first sequence and the third sequence.

Designing the sequences in the first signal by using the foregoing solution can help the terminal device eliminate impact of the frequency offset when receiving the signal affected by the undesirable factors such as the channel, the noise, and the carrier frequency offset (frequency offset for short), thereby improving anti-frequency offset performance. In addition, the sequence obtained after the frequency offset is eliminated still retains the characteristic of the first sequence, for example, retaining a good autocorrelation characteristic of the first sequence, thereby helping the terminal device accurately determine a timing position.

In a possible design, the first sequence corresponding to the other sequence may be a complete sequence, for example, a complete ZC sequence.

In a possible design, the first sequence corresponding to the other sequence may be a subsequence of a second sequence. For example, the second sequence is a complete ZC sequence, and the first sequence corresponding to the other sequence in one sequence pair may be a subsequence of the complete ZC sequence. The other sequence in each sequence pair is corresponding to one first sequence, and first sequences corresponding to the other sequences in all of the at least one sequence pair form the second sequence. Lengths of the first sequences corresponding to the other sequences in different sequence pairs may be the same.

For example, if the first signal includes M sequence pairs, the second sequence includes M subsequences, where one subsequence is corresponding to one sequence pair. The M subsequences are M subsequences obtained by dividing N elements of the second sequence, and each subsequence includes P elements, where M and N are natural numbers greater than or equal to 2, and P is a natural number greater than or equal to 1.

If the first sequence corresponding to the other sequence is the subsequence of the second sequence, a sequence finally obtained by the terminal device is a comparatively long sequence, thereby increasing a code division capacity, for example, indicating a larger quantity of cell identifiers.

In a possible design, the first calculation rule includes at least one of a multiplication rule, a conjugate multiplication rule, a division rule, and a conjugate division rule.

Using the first calculation rule can reduce processing complexity during processing the two sequences by the terminal device.

In a possible design, the other sequence in the one sequence pair may be a sequence obtained by calculating N sequences according to a second calculation rule, and N is a natural number greater than or equal to 2.

Optionally, the second calculation rule may be the same as or different from the first calculation rule. For example, if the second calculation rule is the multiplication rule, the other sequence may be a sequence obtained by multiplying all the N sequences.

In a possible design, each of the N sequences may be a subsequence of a fifth sequence, and the fifth sequence may be a sequence same as the second sequence.

In a possible design, if the one sequence is carried in one time domain symbol, the two sequences in the one sequence pair may be sequences carried in adjacent time domain symbols. For example, sequences carried in any two adjacent time domain symbols form one sequence pair. In other words, one sequence may be located in two different sequence pairs. In this manner, more sequence pairs can be carried, thereby helping the terminal device accurately determine a timing position.

Alternatively, sequences carried in a specific time domain symbol form one sequence pair. For example, a sequence carried in a first time domain symbol and a sequence carried in a second time domain symbol form one sequence pair, and a sequence carried in a third time domain symbol and a sequence carried in a fourth time domain symbol form one sequence pair. In other words, one sequence is located only in one sequence pair. This is not limited in this embodiment of the present invention.

Optionally, the two sequences in the one sequence pair may be sequences carried in non-adjacent time domain symbols. For example, two sequences separated by S time domain symbols form one sequence pair, where S is a natural number greater than or equal to 1. For example, the one sequence may be located in two different sequence pairs. A sequence carried in a first time domain symbol and a sequence carried in a third time domain symbol form one sequence pair, the sequence carried in the third time domain symbol and a sequence carried in a fifth time domain symbol form one sequence pair, a sequence carried in a second time domain symbol and a sequence carried in a fourth time domain symbol form one sequence pair, and so on.

For another example, one sequence is located only in one sequence pair. A sequence carried in a first time domain symbol and a sequence carried in a third time domain symbol may form one sequence pair, a sequence carried in a fifth time domain symbol and a sequence carried in a seventh time domain symbol may form one sequence pair, a sequence carried in a second time domain symbol and a sequence carried in a fourth time domain symbol form one sequence pair, and so on.

In a possible design, the first signal may be used to indicate whether the terminal device has paging scheduling information associated with the terminal device; and/or the first signal may be used to indicate whether there is downlink control information, such as PDCCH scheduling information, associated with the terminal device within a specific time such as a discontinuous reception cycle (DRX cycle); and/or the first signal may be used to indicate whether a system message of a cell serving the terminal device changes; and/or the first signal may be used to indicate a cell identifier of a cell serving the terminal device.

Optionally, the one sequence pair is corresponding to one first sequence, and the first signal may indicate to the terminal device according to an order of the first sequence corresponding to the other sequence in each of the at least one sequence pair in the first signal. For specific indication information, refer to the foregoing description, for example, indicating whether there is the paging scheduling information associated with the terminal device, and/or indicating the cell identifier of the cell serving the terminal device. It should be noted that, when the cell identifier of the cell serving the terminal device is indicated according to the order, in the first signal, of the first sequence corresponding to the other sequence in each of the at least one sequence pair, that different orders of all first sequences are corresponding to different cell identifiers needs to be preset. In this way, the terminal device may determine the cell identifier of the cell serving the terminal device.

Optionally, if the first sequence corresponding to the other sequence in one sequence pair is the subsequence of the second sequence, first sequences corresponding to the other sequences in all of the at least one sequence pair form the second sequence. The terminal device may be indicated by using different formed second sequences. For specific indication information, refer to the foregoing description, for example, indicating whether there is the paging scheduling information associated with the terminal device, and/or indicating the cell identifier of the cell serving the terminal device.

According to a second aspect, an embodiment of the present invention provides a signal receiving method. The signal receiving method includes: receiving, by a terminal device, a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence. Each sequence in the at least one sequence pair and the first sequence corresponding to the other sequence in each sequence pair are complex sequences with lengths greater than 1.

For each sequence pair, the terminal device calculates the element value of the one sequence of the two sequences in the sequence pair and the element value of the other sequence of the two sequences according to a target calculation rule, to obtain a third sequence corresponding to the other sequence in the sequence pair. The third sequence is essentially the same as the first sequence, except that the third sequence is a sequence obtained after the first sequence is affected by undesirable factors such as a channel, noise, and a carrier frequency offset (frequency offset for short).

The terminal device performs correlation processing by using the first sequence and the third sequence. The first sequence is a sequence locally stored by the terminal device, and the first sequence is the same as the first sequence carried in the first signal sent by a network device side.

The network device sends the first signal with the characteristic described in the first aspect. This can help the terminal device eliminate impact of a frequency offset when receiving the signal affected by the undesirable factors such as the channel, the noise, and the carrier frequency offset (frequency offset for short), thereby improving anti-frequency offset performance. In addition, the third sequence obtained after the frequency offset is eliminated still retains a characteristic of the first sequence, for example, retaining a good autocorrelation characteristic of the first sequence, thereby helping the terminal device accurately determine a timing position.

In a possible design, the target calculation rule is corresponding to the first calculation rule. For example, the first calculation rule includes at least one of a multiplication rule, a conjugate multiplication rule, a division rule, and a conjugate division rule, and the target calculation rule may be the conjugate multiplication rule. For example, the terminal device multiplies a conjugate sequence of the other sequence of the two sequences by the one sequence of the two sequences, to obtain the third sequence corresponding to the other sequence. An element value of the conjugate sequence of the other sequence is a conjugate complex number of the element value of the other sequence. Alternatively, the terminal device multiplies a conjugate sequence of the one sequence of the two sequences by the other sequence, to obtain the third sequence.

In a possible design, the first sequence corresponding to the other sequence may be a complete sequence, for example, a complete ZC sequence. The terminal device may perform a convolution operation or a circular convolution operation on the first sequence and the third sequence when performing correlation processing by using the first sequence and the third sequence, and determine the timing position based on an operation result.

In this manner, the terminal device can obtain a plurality of short complete sequences, and the terminal device can directly perform correlation processing to determine the timing position, thereby reducing processing complexity of the terminal device.

In a possible design, the first sequence corresponding to the other sequence may be a subsequence of a second sequence. For example, the second sequence is a complete ZC sequence, and the first sequence corresponding to the other sequence in one sequence pair may be a subsequence of the complete ZC sequence. First sequences corresponding to the other sequences in different sequence pairs are different, and first sequences corresponding to the other sequences in all of the at least one sequence pair form the second sequence.

When performing correlation processing by using the first sequence and the third sequence, the terminal device first needs to obtain a fourth sequence, where the fourth sequence is a sequence consisting of the third sequence corresponding to the other sequence in each of the at least one sequence pair. The third sequence corresponding to the other sequence in each sequence pair is strongly correlated with the other sequence. Third sequences corresponding to the other sequences in different sequence pairs may be different. For example, if the other sequence is A, a third sequence corresponding to the other sequence is A2; or if the other sequence is B, a third sequence corresponding to the other sequence is B2.

The terminal device performs a convolution operation or a circular convolution operation on the second sequence and the fourth sequence, and determines the timing position based on an operation result.

In this manner, the terminal device can obtain a comparatively long complete sequence, thereby increasing a code division capacity. The comparatively long complete sequence has better correlation, improving accuracy of determining the timing position by the terminal device.

According to a third aspect, an embodiment of the present invention provides a signal sending apparatus. The signal sending apparatus has a function of implementing actions of the network device in the method in the first aspect. The function may be implemented by hardware, or implemented by hardware executing corresponding software. The hardware or the software includes one or more modules corresponding to the foregoing function.

In a possible implementation, the signal sending apparatus includes a processing module and a sending module. The processing module is configured to generate a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1. The sending module is configured to send the first signal.

In another possible implementation, the signal sending apparatus includes a transceiver, a memory, and a processor. The transceiver is configured to receive or send a signal. The memory stores a group of program code, and the processor is configured to invoke the program code stored in the memory, to perform the following operations: generating a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1; and sending the first signal to a terminal device.

Based on a same inventive concept, for a problem-solving principle and beneficial effects of the apparatus, refer to the method and beneficial effects brought by the method in the first aspect. Therefore, for implementation of the apparatus, refer to implementation of the method. Repeated content is not described again.

According to a fourth aspect, an embodiment of the present invention provides a computer readable storage medium, and the computer readable storage medium stores an instruction. When the instruction is run on a computer, the computer is enabled to perform the method in the first aspect.

According to a fifth aspect, an embodiment of the present invention provides a computer program product including an instruction. When the computer program product is run on a computer, the computer is enabled to perform the method in the first aspect.

According to a sixth aspect, an embodiment of the present invention provides a signal receiving apparatus. The signal receiving apparatus has a function of implementing actions of the terminal device in the method in the second aspect. The function may be implemented by hardware, or implemented by hardware executing corresponding software. The hardware or the software includes one or more modules corresponding to the foregoing function.

In a possible implementation, the signal receiving apparatus includes a transceiver unit and a processing unit. The transceiver unit is configured to receive a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1. The processing unit is configured to calculate, according to a target calculation rule, the element value of the one sequence of the two sequences and the element value of the other sequence of the two sequences, to obtain a third sequence corresponding to the other sequence. The processing unit is further configured to obtain a timing position by using the first sequence and the third sequence.

In another possible implementation, the signal receiving apparatus includes a transceiver, a memory, and a processor. The transceiver is configured to receive or send a signal. The memory stores a group of program code, and the processor is configured to invoke the program code stored in the memory, to perform the following operations: receiving a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1; calculating the element value of the one sequence of the two sequences and the element value of the other sequence of the two sequences according to a target calculation rule, to obtain a third sequence corresponding to the other sequence; and obtaining, by the terminal device, a timing position by using the first sequence and the third sequence.

Based on a same inventive concept, for a problem-solving principle and beneficial effects of the apparatus, refer to the method and beneficial effects brought by the method in the second aspect. Therefore, for implementation of the apparatus, refer to implementation of the method. Repeated content is not described again.

According to a seventh aspect, an embodiment of the present invention provides a computer readable storage medium, and the computer readable storage medium stores an instruction. When the instruction is run on a computer, the computer is enabled to perform the method in the second aspect.

According to an eighth aspect, an embodiment of the present invention provides a computer program product including an instruction. When the computer program product is run on a computer, the computer is enabled to perform the method in the second aspect.

In the embodiments of the present invention, the first signal includes at least one sequence pair, each sequence pair includes two sequences, and the element value of the one sequence of the two sequences is the value obtained by calculating, according to the first calculation rule, the element value of the other sequence of the two sequences and the element value of the first sequence corresponding to the other sequence. Because the foregoing relationship exists between the two sequences in the one sequence pair, the terminal device may eliminate impact of the frequency offset when receiving the signal affected by the undesirable factors such as the channel, the noise, and the carrier frequency offset (frequency offset for short), thereby improving anti-frequency offset performance. In addition, a sequence may still be obtained after the frequency offset is eliminated, and the sequence still retains the characteristic of the first sequence, thereby helping the terminal device accurately determine the timing position.

BRIEF DESCRIPTION OF DRAWINGS

To describe the technical solutions in the embodiments of the present invention or in the background more clearly, the following briefly describes the accompanying drawings required for describing the embodiments of the present invention or the background.

FIG. 5a to FIG. 3d are schematic diagrams of sequence designs according to an embodiment of the present invention;

DESCRIPTION OF EMBODIMENTS

Figure 1A:
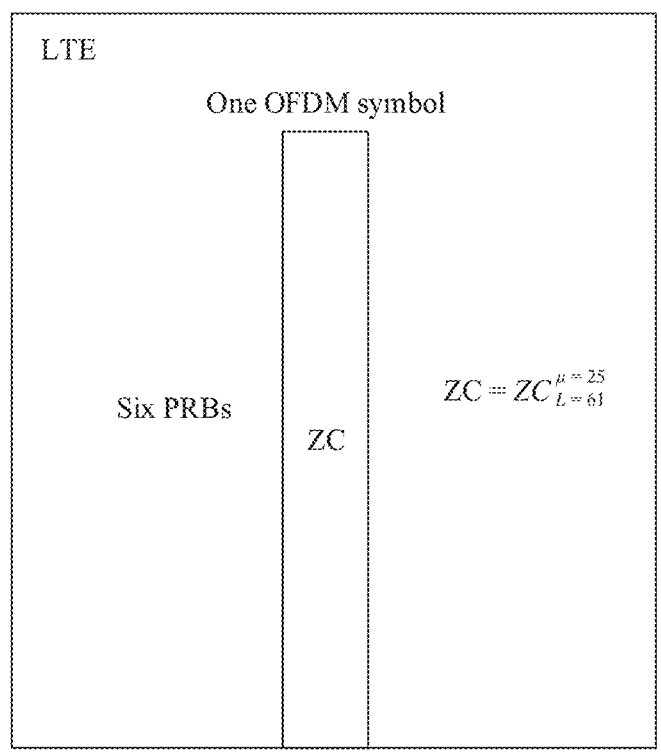
FIG. 1a is a schematic diagram of a PSS sequence design in LTE.

The following describes the embodiments of the present invention with reference to the accompanying drawings in the embodiments of the present invention.

A sequence pair in the embodiments of the present invention refers to two sequences in a first signal that meet a specific condition, where the specific condition may be: In the two sequences, an element value of one sequence is a value obtained by calculating, according to a first calculation rule, an element value of the other sequence of the two sequences and an element value of a first sequence corresponding to the other sequence. The two sequences may be sequences carried in adjacent time domain symbols, or may be sequences carried in non-adjacent time domain symbols.

In the embodiments of the present invention, in two sequences in one sequence pair, a first sequence corresponding to the other sequence indicates that the first sequence is strongly correlated with the other sequence. For example, if the other sequence is A, a first sequence corresponding to the other sequence is A1; or if the other sequence is B, a first sequence corresponding to the other sequence is B1. The other sequence in one sequence pair is corresponding to one first sequence, and first sequences corresponding to the other sequences in different sequence pairs may be different.

A complete sequence mentioned in the embodiments of the present invention may be a Zadoff-Chu (ZC) sequence, a phased sequence, an m sequence, a Gold sequence, an M sequence, a GMW sequence, a Kasami sequence, a Bent sequence, a Hadamard sequence, a DFT sequence, or the like. It should be noted that the sequence type is not limited in the present invention provided that the sequence is a complex sequence with a length greater than 1 (the complex sequence means that a sequence element is a complex number). Preferably, the complex sequence may be a sequence with a good autocorrelation characteristic or an orthogonality characteristic.

Alternatively, a complete sequence mentioned in the embodiments of the present invention may be various sequences transformed from the foregoing sequence, for example, a sequence obtained after cyclic shift extension is performed on the foregoing sequence, a sequence obtained after some elements are truncating from the foregoing sequence, a conjugate sequence of the foregoing sequence, a sequence obtained after phase rotation is performed on the foregoing sequence (in other words, each element of the foregoing sequence is rotated by a given phase), a sequence obtained after a plurality of the foregoing sequences are multiplied, a sequence obtained after conjugate multiplication, a sequence obtained after addition, a sequence obtained after modulo 2 addition, or the like. It should be noted that the complete sequence actually used in the present invention may alternatively be a sequence obtained after a plurality of the foregoing transformation processes are performed on the foregoing sequence. For example, a sequence obtained after two of the foregoing sequences are multiplied and then cyclic shift extension is performed on a sequence obtained after multiplication may be used.

It should be noted that, for ease of description, a ZC sequence is used as an example in all the embodiments of the present invention. It may be understood that the ZC sequence mentioned in the embodiments of the present invention may be alternatively replaced with any complete sequence mentioned above.

The embodiments of the present invention is applicable to an LTE system, or is applicable to another wireless communications system, such as a global system for mobile communications (Global System for Mobile Communication, GSM), a mobile communications system (Universal Mobile Telecommunications System, UMTS), a code division multiple access (Code Division Multiple Access, CDMA) system, or a new network system. In the embodiments of the present invention, NB-IoT in the LTE system is mainly used as an example for description.

Figure 2:
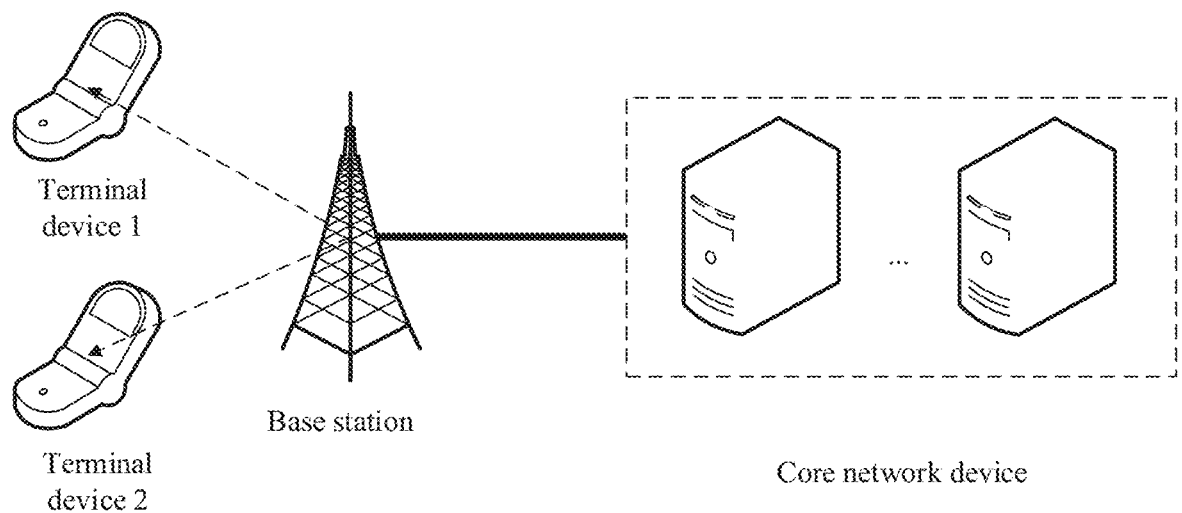
FIG. 2 is a system architecture diagram according to an embodiment of the present invention.

The wireless communications system usually includes cells. As shown in FIG. 2, each cell includes a base station (Base Station, BS), the base station provides a communications service for a plurality of terminal devices, and the base station is connected to a core network device. The base station includes a baseband unit (Baseband Unit, BBU) and a remote radio unit (Remote Radio Unit, RRU). The BBU and the RRU may be placed at different places. For example, the RRU is remote and placed in an open area with heavy traffic, and the BBU is placed in a central equipment room. Alternatively, the BBU and the RRU may be placed in a same equipment room. The BBU and the RRU may be different components in a rack.

A base station in the embodiments of the present invention is an apparatus that is deployed in a radio access network and that is configured to provide a wireless communication function for a terminal device. The base station may include a macro base station, a micro base station (also referred to as a small cell), a relay station, an access point, a transmission receiver point (Transmission Receiver point, TRP), and the like in various forms. In systems that use different radio access technologies, names of a device that has a base station function may be different. For example, in an LTE system, the device is referred to as an evolved NodeB (evolved NodeB, eNB or eNodeB), and in a 3rd generation (3rd Generation, 3G) system, the device is referred to as a NodeB (Node B, NB), and the like. For ease of description, in all the embodiments of this application, all the foregoing apparatuses that provide a wireless communication function for the terminal device are referred to as a network device.

The terminal device mentioned in the embodiments of the present invention may be a device that provides a user with voice and/or data connectivity, a handheld device with a radio connection function, or another processing device connected to a radio modem. The wireless terminal may communicate with one or more core networks through a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS, Personal Communication Service) phone, a cordless telephone set, a session initiation protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment). For ease of description, the devices mentioned above are collectively referred to as terminal device in all the embodiments of this application.

After a signal sent by a network device to a terminal device is affected by undesirable factors such as a channel, noise, and a carrier frequency offset (frequency offset for short), there is usually a carrier frequency offset, and the carrier frequency offset causes a continuous phase change of the signal in time domain. After receiving the signal, the terminal device needs to perform downlink synchronization processing, to determine a timing position. Generally, for ease of synchronization, the signal sent by the network device includes a sequence used for synchronization. The sequence may be a sequence with a good autocorrelation characteristic. For example, a ZC (Zadoff-Chu) sequence has a very good autocorrelation characteristic and a very low cross-correlation characteristic. Such performance may be used to generate the sequence used for synchronization.

Figure 1B:
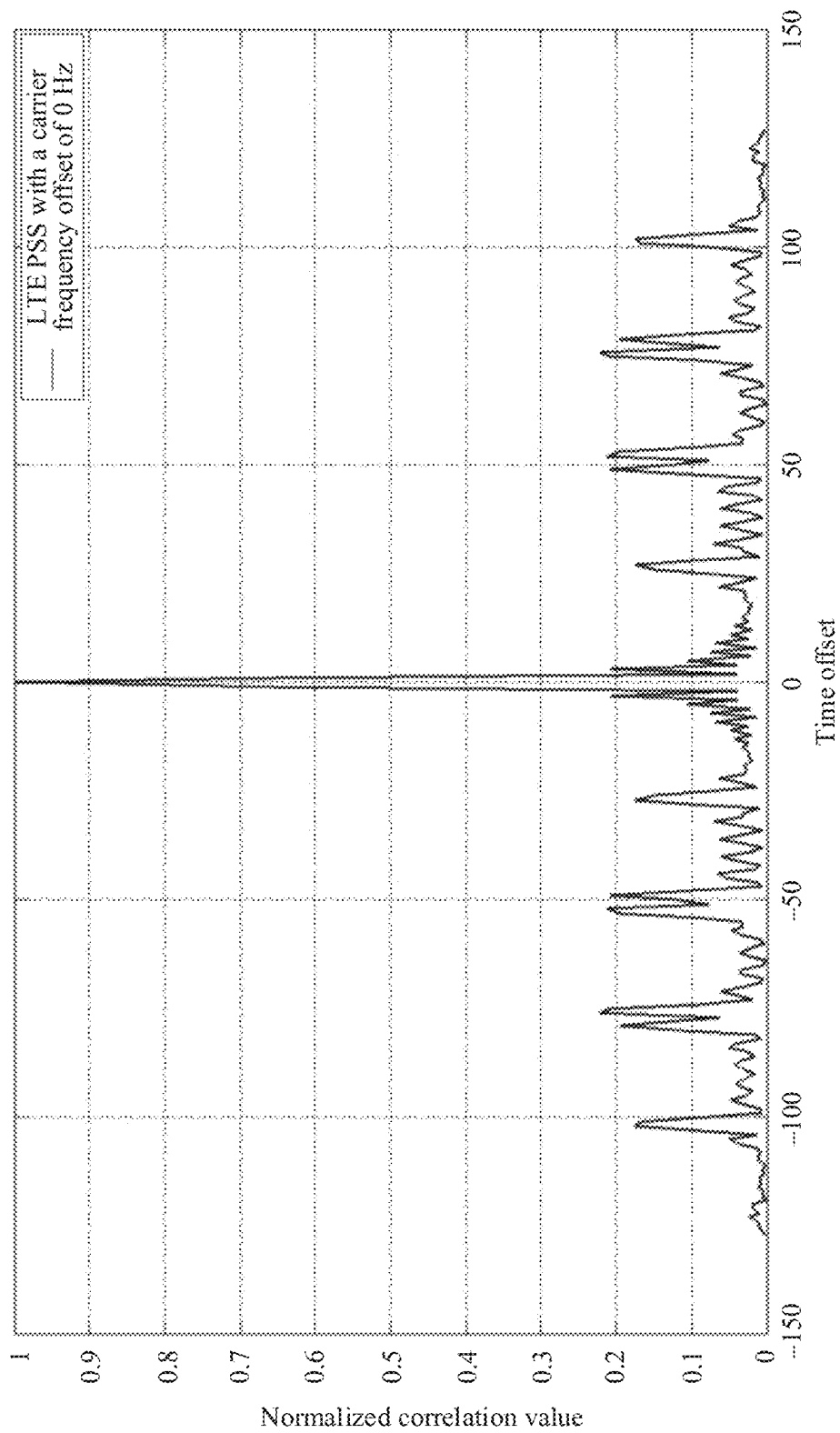
FIG. 1b is a simulation diagram of a PSS sequence design in LTE.
Figure 1C:
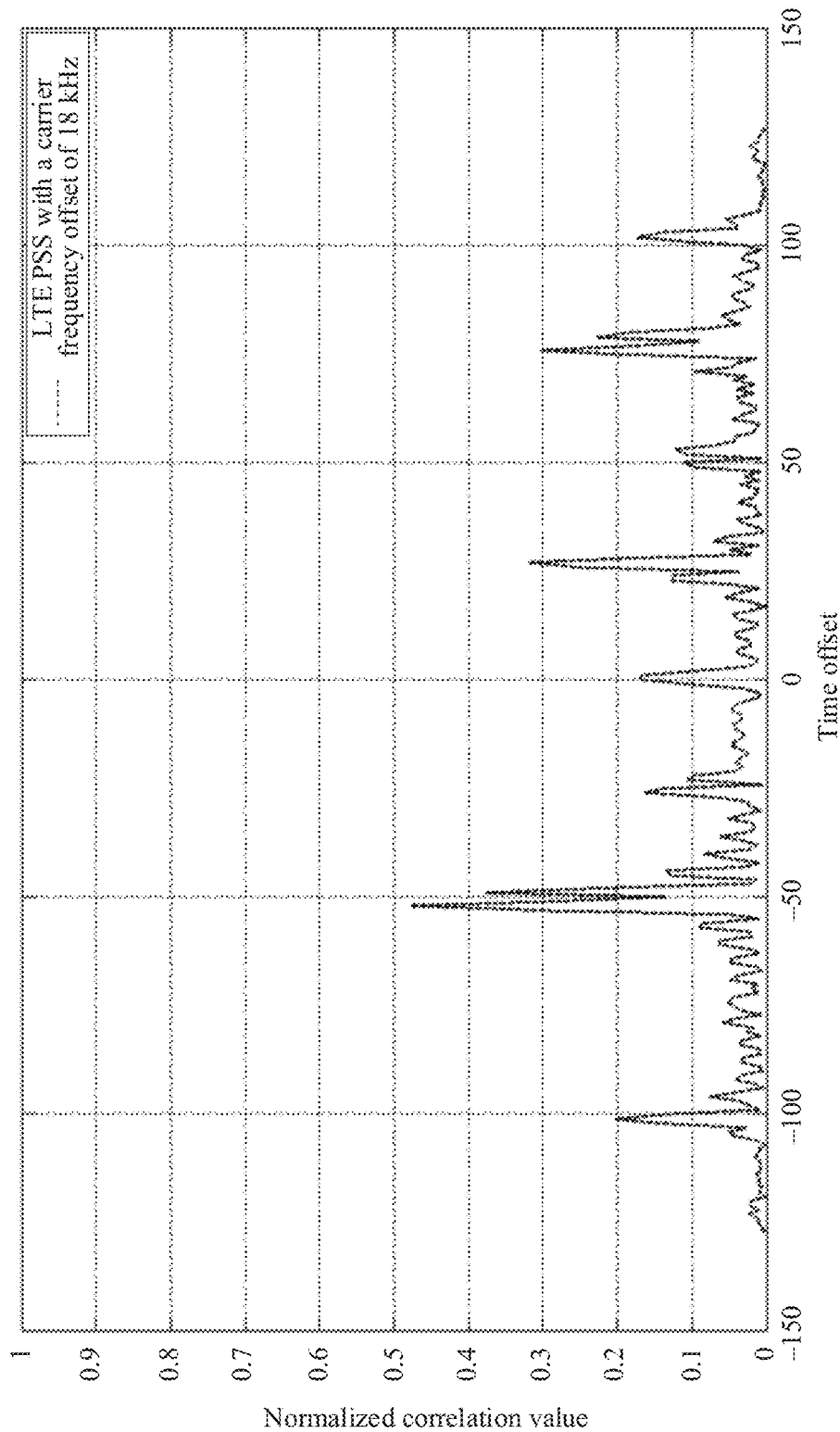
FIG. 1c is another simulation diagram of a PSS sequence design in LTE.

However, due to impact of the undesirable factors such as the channel, the noise, and the carrier frequency offset (frequency offset for short), the sequence may also have a carrier frequency offset, and the carrier frequency offset causes a continuous phase change of the sequence in time domain. Consequently, a correlation characteristic of the sequence may be degraded or even be damaged. For example, a primary synchronization signal in LTE uses a ZC (Zadoff-Chu) sequence with a root index of 25, 29, or 34 and with a length of 63, and the sequence has comparatively poor anti-frequency offset performance. As shown in FIG. 1b, if the sequence has no frequency offset (in other words, a sequence received by the terminal device has no frequency offset relative to a sequence sent by the network device), when the terminal device performs correlation processing, a correlation peak is comparatively obvious, and therefore a timing position is comparatively easy to determine. However, if the sequence has a frequency offset (in other words, a sequence received by the terminal device has a frequency offset relative to a sequence sent by the network device), for example, the frequency offset is 18 kHz, and when the terminal device performs correlation processing, a correlation peak completely disappears, and consequently a timing position cannot be determined. The correlation processing means that the terminal device performs a correlation operation on the received sequence and a locally stored sequence, and the sequence locally stored in the terminal device is a clean sequence corresponding to the received sequence. The clean sequence is a sequence that is not affected by the undesirable factors such as the channel, the noise, and the carrier frequency offset (frequency offset for short).

Figure 3A:
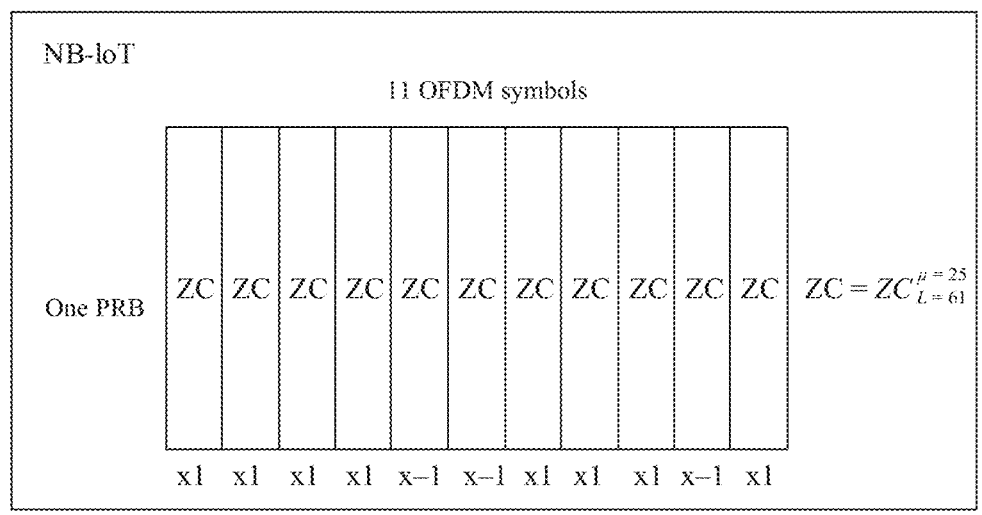
FIG. 3a is a schematic diagram of an NPSS sequence design in NB-IoT according to an embodiment of the present invention.
Figure 3B:
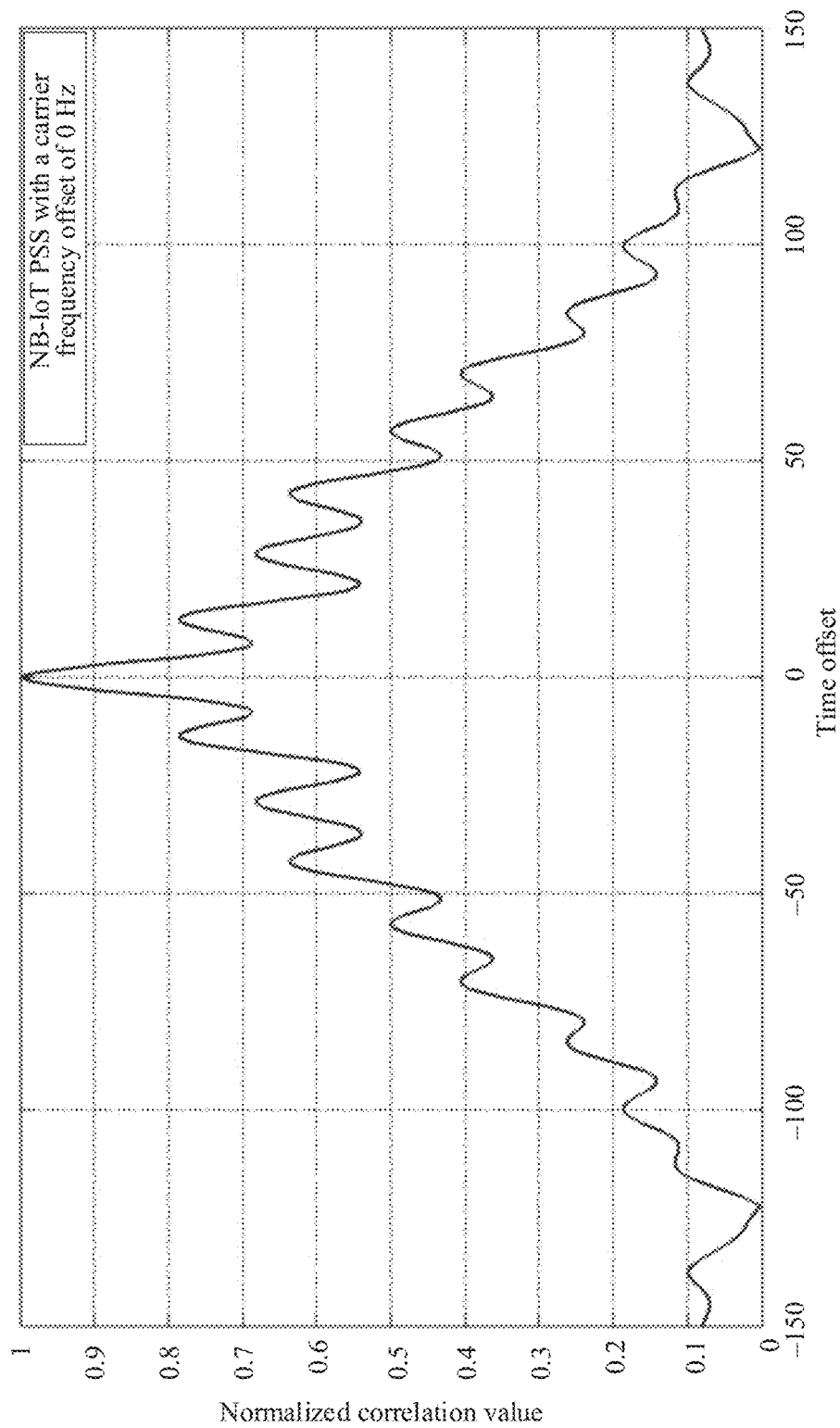
FIG. 3b is a simulation diagram of an NPSS sequence design in NB-IoT according to an embodiment of the present invention.

Optionally, as shown in FIG. 3a, 11 ZC sequences with a same root index 5 are currently used for a primary synchronization signal in NB-IoT, each ZC sequence has a length of 11, and each ZC sequence is multiplied by 1 or −1. Due to impact of the undesirable factors such as the channel, the noise, and the carrier frequency offset (frequency offset for short), compared with a sequence in the signal sent by the network device, a sequence in the signal received by the terminal device has a continuous phase change in time domain. For example, phase change values form an arithmetic sequence. Before performing synchronization processing, the terminal device performs an autocorrelation operation on adjacent sequences (to be specific, a conjugate of a current sequence is multiplied by a next sequence), so that impact of the frequency offset can be eliminated. However, there is no good autocorrelation characteristic of the ZC sequence in a sequence obtained after the autocorrelation operation (to be specific, eliminating the frequency offset) is performed. Therefore, a timing position may also be inaccurate. FIG. 3b is a simulation diagram obtained in a sequence design manner used in a primary synchronization signal in NB-IoT. The simulation diagram is a correlation simulation diagram of a terminal device in a correlation processing process. As shown in the figure, a correlation peak is comparatively moderate. After a subsequent synchronization processing process, ambiguity is introduced, resulting in low synchronization precision.

To resolve the foregoing problem, an embodiment of the present invention discloses a sequence design manner of a signal. A network device generates a first signal, where the first signal includes at least one sequence pair, each sequence pair includes two sequences, and an element value of one sequence of the two sequences is a value obtained by calculating, according to a first calculation rule, an element value of the other sequence of the two sequences and an element value of a first sequence corresponding to the other sequence. For example, one sequence pair includes two sequences, and the one sequence pair may be any one sequence pair carried in a first signal. For ease of description, in this embodiment of the present invention, one sequence of the two sequences is referred to as a sequence 2, the other sequence is referred to as a sequence 3, and the first sequence corresponding to the other sequence is referred to as a sequence 1. It should be noted that the sequence 1 is strongly correlated with the sequence 3. The other sequence in one sequence pair is corresponding to one first sequence, and the first signal has at least one sequence pair, and also has at least one first sequence. First sequences corresponding to the other sequences in different sequence pairs may be different sequences.

For example, if the sequence 3 is a sequence Z1, and the sequence 1 corresponding to the sequence 3 is a sequence Z2, the sequence 2 is a sequence obtained by calculating, according to a first calculation rule, the sequence 3 and the sequence 1 corresponding to the sequence 3. Herein, that the first calculation rule is a multiplication rule is used as an example for description. The sequence 2 is Z1×Z2, and the two sequences in the one sequence pair are Z1 and Z1×Z2. It should be noted that the two sequences are multiplied to obtain a product sequence with a same length as the two sequences, and each element in the obtained product sequence is a product of corresponding elements in the two sequences.

Optionally, the first sequence corresponding to the other sequence in the one sequence pair may be an independent complete sequence, for example, a ZC sequence. Alternatively, the first sequence corresponding to the other sequence in the one sequence pair may be a subsequence of a complete sequence, for example, a subsequence of a ZC sequence. It should be noted that if the first sequence corresponding to the other sequence in the one sequence pair is a subsequence of a sequence, a first sequence corresponding to the other sequence in each of the at least one sequence pair included in the first signal forms a complete sequence, for example, forming a ZC sequence. In other words, different subsequences of the complete sequence may be first sequences corresponding to the other sequences in different sequence pairs.

Because there is the foregoing relationship between two sequences in one sequence pair, after receiving the first signal, the terminal device may perform calculation processing on the two sequences in the one sequence pair based on a target calculation rule, to obtain a third sequence corresponding to the other sequence in the one sequence pair. The target calculation rule needs to be determined according to the first calculation rule used by the network device. For example, the first calculation rule is at least one of a multiplication rule, a conjugate multiplication rule, a division rule, and a conjugate division rule. For the target calculation rule, with regard to the two sequences in the one sequence pair, a conjugate sequence of the other sequence multiplies by one sequence according to the target calculation rule, to obtain the third sequence corresponding to the other sequence. Calculation processing is performed on the two sequences in the sequence pair according to the target calculation rule, thereby improving anti-frequency offset performance.

It should be noted that, if there is no impact of the undesirable factors such as the channel, the noise, and the carrier frequency offset (frequency offset for short), the third sequence is the same as the first sequence. Because there is impact of the undesirable factors such as the channel, the noise, and the carrier frequency offset (frequency offset for short), a fourth sequence may be a sequence obtained after the first sequence is affected by the undesirable factors such as the channel, the noise, and the carrier frequency offset (frequency offset for short). However, the fourth sequence retains a correlation characteristic of the first sequence. For example, the first sequence is a ZC sequence, and the fourth sequence still retains a good autocorrelation characteristic of the ZC sequence. Therefore, when correlation processing is performed by using the first sequence and the third sequence, an obvious correlation peak may still appear, thereby helping the terminal device accurately determine a timing position.

Figure 4:
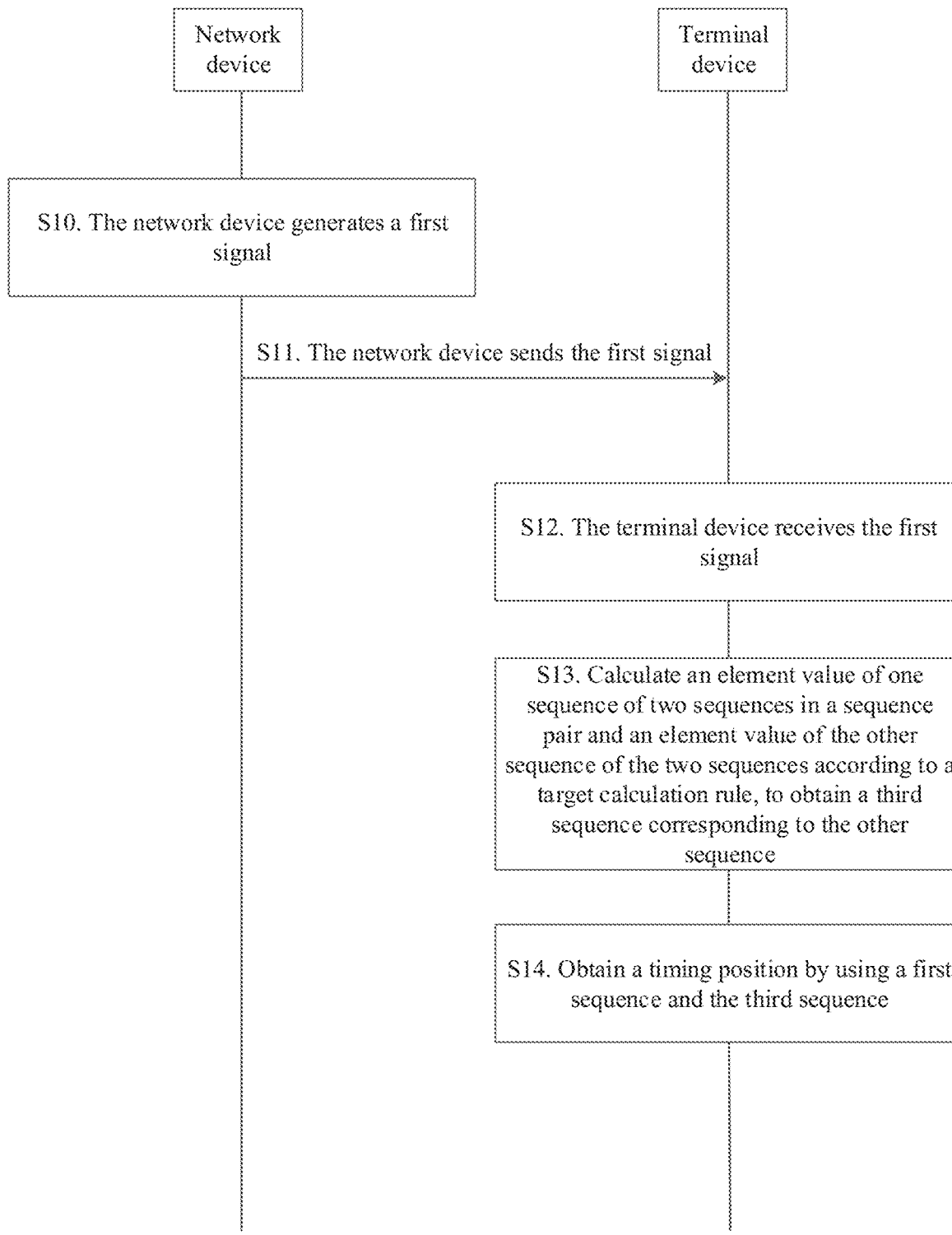
FIG. 4 is an interaction flowchart of a signal processing method according to an embodiment of the present invention.

FIG. 4 is an interaction diagram of a signal processing method according to an embodiment of the present invention. As shown in the figure, the signal processing method in this embodiment of the present invention includes but is not limited to the following steps.

S10. A network device generates a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1.

In an embodiment, the network device generates the first signal. The first signal includes at least one sequence pair, and two sequences in one sequence pair meet the following condition: An element value of one sequence is a value obtained by calculating, according to a first calculation rule, an element value of the other sequence of the two sequences and an element value of a first sequence corresponding to the other sequence. It should be noted that the first sequence corresponding to the other sequence is strongly correlated with the other sequence. For example, if the other sequence is a sequence A, a first sequence corresponding to the other sequence is a sequence A1; or if the other sequence is a sequence B, a first sequence corresponding to the other sequence is a sequence B1. The other sequences in different sequence pairs are different, and first sequences corresponding to the other sequences may also be different.

For ease of description, in this embodiment of the present invention, one sequence of the two sequences in the one sequence pair is referred to as a sequence 2, the other sequence is referred to as a sequence 3, and the first sequence corresponding to the other sequence is referred to as a sequence 1. For example, if the sequence 3 is a sequence Z1, and a first sequence (namely, the sequence 1) corresponding to the sequence 3 is a sequence Z2, the sequence 2 is a sequence obtained by calculating, according to the first calculation rule, the sequence 3 and the first sequence corresponding to the sequence 3. It should be noted that two sequences in each of the at least one sequence pair included in the first signal meet the foregoing condition, and a difference lies in that two sequences in one sequence pair may not be completely the same as two sequences in another sequence pair. First sequences corresponding to the other sequences in different sequence pairs may also be different sequences.

Optionally, the first calculation rule may include at least one of a multiplication rule, a conjugate multiplication rule, a division rule, and a conjugate division rule. Herein, one sequence pair including a sequence 2 and a sequence 3 is still used as an example for description. The sequence 3 is a sequence Z1, and a first sequence (namely, the sequence 1) corresponding to the sequence 3 is a sequence Z2. If the first calculation rule is the multiplication rule, the sequence 2 is Z1×Z2. If the first calculation rule is the conjugate multiplication rule, the sequence 2 may be Z1*×Z2, or the sequence 2 may be Z1×Z2*. If the first calculation rule is the division rule, the sequence 2 may be Z1/Z2. If the first calculation rule is the conjugate division rule, the sequence 2 may be Z1*/Z2, or the sequence 2 may be Z1/Z2*. It should be noted that the sequence Z* is a conjugate sequence of the sequence Z, in other words, a value of each element in the sequence Z* is a conjugate complex number of a corresponding element in the sequence Z.

Further, optionally, a manner of calculating the sequence 3 and the sequence 1 according to the first calculation rule may be as follows: performing element alignment calculation on an element value included in the sequence 3 and an element value included in the sequence 1. For example, the sequence 3 is $a_1, a_2, \ldots, a_n$, the sequence 1 is $b_1, b_2, \ldots, b_n$, and the calculated sequence 2 is $c_1, c_2, \ldots, c_n$. Each element value $c_i$ in the sequence 2 is a value obtained by performing processing on $a_i$ and $b_i$ according to the first calculation rule. Herein, that the first calculation rule is the multiplication rule is used as an example for description, and $c_i = a_i \times b_i, i=1,2, \ldots, n$. If the first calculation rule is the conjugate multiplication rule, $c_i = a_i \times b_i^*, i=1,2, \ldots, n$ or $c_i = a_i^* \times b_i, i=1,2, \ldots, n$, where $b_i^*$ represents a conjugate complex number of $b_i$.

Optionally, the first sequence corresponding to the other sequence in the one sequence pair may be a complete sequence, for example, a ZC sequence. Alternatively, the first sequence corresponding to the other sequence in the one sequence pair may be a subsequence of a second sequence. For example, the second sequence is a complete ZC sequence, the first sequence corresponding to the other sequence in the one sequence pair is only a subsequence of the complete ZC sequence, and first sequences corresponding to the other sequences in all sequence pairs of the first signal form the second sequence. It should be noted that an element included in the subsequence is a part of a complete sequence corresponding to the subsequence.

For example, if the second sequence includes N elements, the N elements may be divided into M subsequences, and each subsequence includes P elements, where M is a natural number greater than or equal to 2, and P is a natural number greater than or equal to 1. Each of the M subsequences is a first sequence corresponding to the other sequence in one sequence pair. For example, the second sequence includes three subsequences: P1, P2, and P3; and the first signal includes three sequence pairs: a sequence pair 1, a sequence pair 2, and a sequence pair 3. In this case, a first sequence corresponding to the other sequence in the sequence pair 1 is P1, a first sequence corresponding to the other sequence in the sequence pair 2 is P2, and a first sequence corresponding to the other sequence in the sequence pair 3 is P3.

It should be noted that, during subsequence division, if the N elements cannot be evenly divided, a cyclic shift manner may be used to divide the N elements into the M subsequences. For example, if N is 5, and two subsequences need to be obtained through division, the last two elements and the first element in the sequence may be classified into one subsequence. If subsequence division is performed in this manner, M×P is greater than N. In this subsequence division manner, a formed second sequence is a sequence transformed from the ZC sequence, in other words, the second sequence is a sequence formed after the cyclic shift is performed on the ZC sequence.

Alternatively, if the N elements cannot be evenly divided, a truncating manner may be used to divide the N elements into the M subsequences. For example, if N is 7, and two subsequences need to be obtained through division, the last element of the sequence may be discarded, and remaining elements are classified into two subsequences. If subsequence division is performed in this manner, M×P is less than N. In this subsequence division manner, a formed second sequence is a sequence transformed from the ZC sequence, in other words, the second sequence is a sequence formed after some elements are truncated from the ZC sequence.

Optionally, the other sequence in one sequence pair may be a sequence, for example, a ZC sequence or a subsequence of a ZC sequence, or a complex number. The complex number may be 1 or another number.

Optionally, the other sequence in the one sequence pair may be a sequence obtained by calculating N sequences according to a second calculation rule, where N is a natural number greater than or equal to 2. The second calculation rule may be the same as or different from the first calculation rule. For ease of description, one sequence pair including a sequence 2 and a sequence 3 is still used as an example for description herein. The sequence 2 is one sequence of two sequences in the one sequence pair, and the sequence 3 is the other sequence of the two sequences in the sequence pair. If the second calculation rule is, for example, the multiplication rule, the sequence 3 may be a sequence obtained by multiplying the two sequences. For example, the sequence 3 is Z1×Z2, a first sequence corresponding to the sequence 3 may be Z3, and the sequence 2 is Z1×Z2×Z3. Z1, Z2, and Z3 may all be ZC sequences. Alternatively, Z1, Z2, and Z3 may all be subsequences of the second sequence. For example, Z1, Z2, and Z3 each may be a subsequence of a ZC sequence.

Optionally, the two sequences in the one sequence pair may be sequences carried in adjacent time domain symbols, or may be sequences carried in non-adjacent time domain symbols. Optionally, a same sequence may simultaneously exist in two sequence pairs. For example, sequences carried in any two adjacent symbols form one sequence pair. It should be noted that the last sequence may exist only in one sequence pair. Alternatively, any one sequence may be located only in one sequence pair, in other words, a total quantity of sequences is an even number N, and a quantity of sequence pairs is N/2.

FIG. 5a to FIG. 5d show several optional sequence design manners provided in this embodiment of the present invention. It should be noted that, in this embodiment of the present invention, an example in which one time domain symbol carries one sequence is used for description. It may be understood that a plurality of time domain symbols may carry one sequence, or one rime domain symbol may carry a plurality of sequences. This is not limited in this embodiment of the present invention. In addition, a form of a sequence carried in each time domain symbol in FIGS. 5a to 5d is not limited in this embodiment of the present invention, and the form of the sequence in FIG. 5a to FIG. 5d is merely an example. Sequences C, C1, C2, C3, and C4 in FIG. 5a to FIG. 5d may be any complex sequences, and elements in the sequence may be the same or may be different.

Figure 5A:
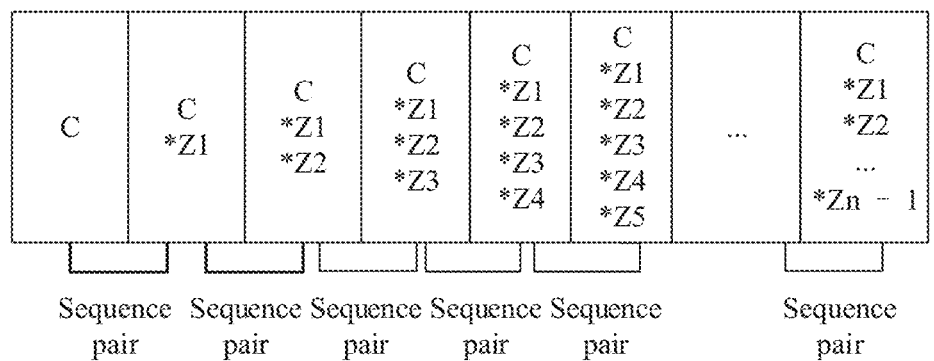
Figure 5B:
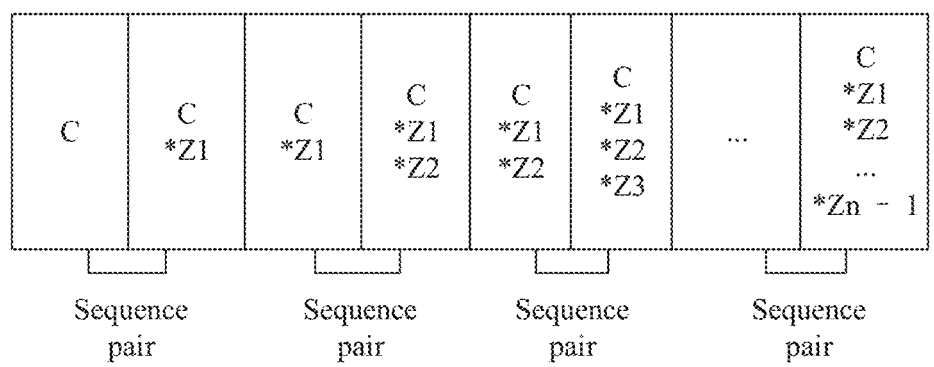

Referring to FIG. 5a and FIG. 5b, two sequences in one sequence pair are sequences carried in adjacent time domain symbols.

Referring to FIG. 5a, a same sequence may be located in two different sequence pairs, but the first sequence and the last sequence are located only in one sequence pair. To be specific, sequences carried in any two adjacent time domain symbols in FIG. 5a form one sequence pair. For example, a sequence Z1×Z2 carried in a third time domain symbol and a sequence Z1 carried in an adjacent time domain symbol form one sequence pair, and the sequence Z1×Z2 carried in the third time domain symbol and a sequence Z1×Z2×Z3 carried in an adjacent time domain symbol also form one sequence pair.

Optionally, a sequence-level differential form is used in FIG. 5a. To be specific, a sequence carried in a next time domain symbol is a sequence obtained by multiplying a sequence carried in a current time domain symbol by one first sequence. It can be learned from the figure that different sequence pairs are corresponding to different first sequences. In other words, the first sequence in the sequence pair is corresponding to a sequence carried in the current time domain symbol in the sequence pair.

Optionally, sequences Z1, Z2, Z3, Z4, . . . , and Zn−1 in FIG. 5a each may be a complete sequence, or sequences Z1, Z2, Z3, Z4, . . . , and Zn−1 each may be a subsequence of a complete sequence. In other words, the complete sequence includes (n−1) subsequences, and the (n−1) subsequences may form the complete sequence. In other words, the sequences Z1, Z2, Z3, Z4, . . . , and Zn−1 form the complete sequence. It should be noted that the complete sequence herein may be a ZC sequence, or may be various sequences transformed from the ZC sequence. Details are not described herein. It may be understood that the sequence in FIG. 5a may be not limited to the ZC sequence. This is not limited in this embodiment of the present invention.

Referring to FIG. 5b, a same sequence may be located only in one sequence pair, but two sequences in one sequence pair are carried in adjacent time domain symbols. For example, a sequence carried in a first time domain symbol and a sequence carried in a second time domain symbol form one sequence pair, a sequence carried in a third time domain symbol and a sequence carried in a fourth time domain symbol form one sequence pair, and so on.

As shown in FIG. 5b, for two sequences in one sequence pair, a sequence carried in a next time domain symbol is a sequence obtained by multiplying a sequence carried in a current time domain symbol by a first sequence corresponding to the sequence carried in the current time domain symbol. It can be learned from the figure that if the sequence carried in the current time domain symbol is different, and the first sequence corresponding to the sequence carried in the current time domain symbol may also be different.

Optionally, sequences Z1, Z2, Z3, Z4, . . . , and Zn−1 in FIG. 5b each may be a complete sequence, or sequences Z1, Z2, Z3, Z4, . . . , and Zn−1 each may be a subsequence of a complete sequence. In other words, the complete sequence includes (n−1) subsequences, and the (n−1) subsequences may form the complete sequence. In other words, the sequences Z1, Z2, Z3, Z4, . . . , and Zn−1 form the complete sequence. It should be noted that the complete sequence herein may be a ZC sequence, or may be various sequences transformed from the ZC sequence. Details are not described herein. It may be understood that the sequence in FIG. 5b is not limited to the ZC sequence. This is not limited in this embodiment of the present invention.

Figure 5C:
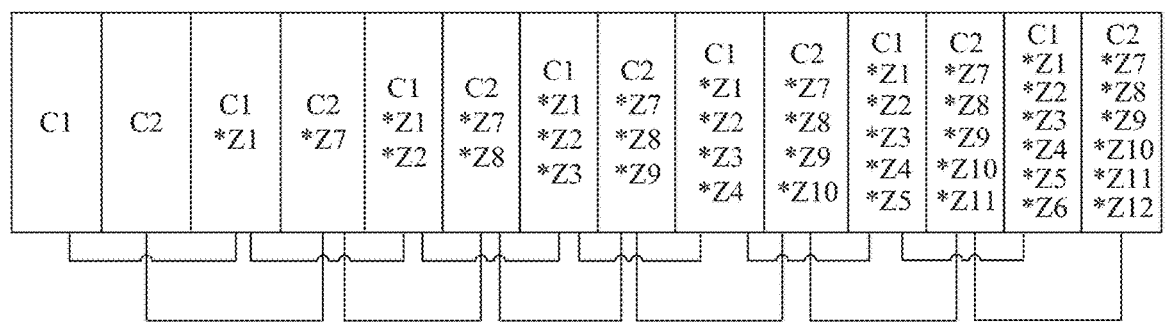
Figure 5D:
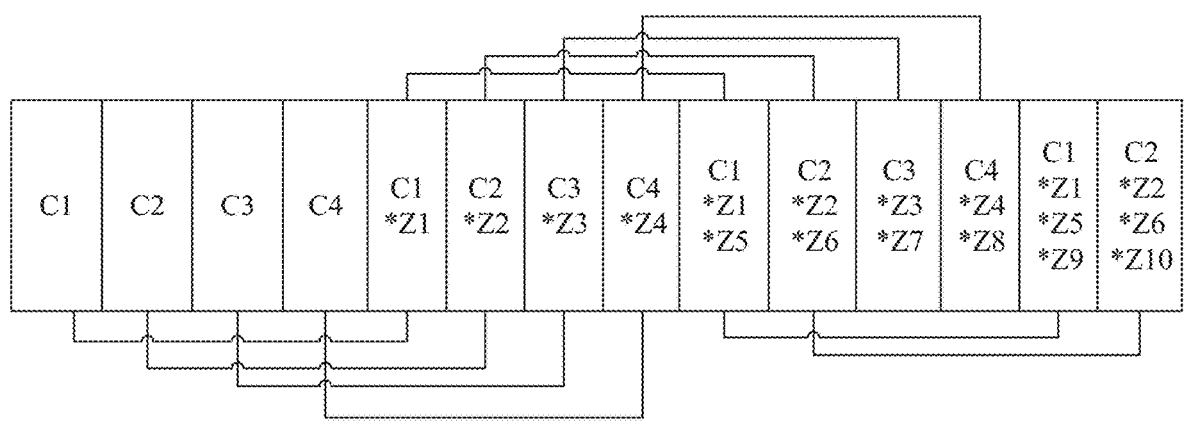

Referring to FIG. 5c and FIG. 5d, two sequences in one sequence pair may be sequences carried in non-adjacent time domain symbols. In FIG. 5c and FIG. 5d, only 14 sequences carried in 14 time domain symbols are used as an example. It may be understood that there may be another quantity of sequences. This is not limited in this embodiment of the present invention.

Referring to FIG. 5c, a same sequence may be located in two different sequence pairs, and two sequences in one sequence pair are separated by one sequence. The first sequence, the second sequence, the last sequence, and the penultimate sequence each are located in one sequence pair. Sequences carried in time domain symbols separated by one time domain symbol in FIG. 5c form one sequence pair.

It can be learned from the figure that different sequence pairs are corresponding to different first sequences. In other words, the first sequence in the sequence pair is corresponding to a sequence carried in an earlier time domain symbol in the sequence pair.

Optionally, sequences Z1, Z2, Z3, Z4, . . . , and Z12 in FIG. 5c each may be a complete sequence, or sequences Z1, Z2, Z3, Z4, . . . , and Z12 each may be a subsequence of a complete sequence. In other words, the complete sequence includes 12 subsequences, and the 12 subsequences may form the complete sequence. In other words, the sequences Z1, Z2, Z3, Z4, . . . , and Z12 form the complete sequence. It should be noted that the complete sequence herein may be a ZC sequence, or may be various sequences transformed from the ZC sequence. Details are not described herein. It may be understood that the sequence in FIG. 5c is not limited to the ZC sequence. This is not limited in this embodiment of the present invention.

Referring to FIG. 3d, a same sequence may be located only in one sequence pair, or a same sequence may be located in two different sequence pairs. Two sequences in one sequence pair are separated by three time domain symbols. For example, a sequence carried in a first time domain symbol and a sequence carried in a fifth time domain symbol form one sequence pair, a sequence carried in a second time domain symbol and a sequence carried in a sixth time domain symbol form one sequence pair, and so on.

As shown in FIG. 5d, for two sequences in one sequence pair, a sequence carried in a later time domain symbol is a sequence obtained by multiplying a sequence carried in an earlier time domain symbol by a first sequence corresponding to the sequence carried in the earlier time domain symbol. It can be learned from the figure that if sequences carried in earlier time domain symbols are different, corresponding first sequences may also be different.

Optionally, sequences Z1, Z2, Z3, Z4, . . . , and Z10 in FIG. 5d each may be a complete sequence, or sequences Z1, Z2, Z3, Z4, . . . , and Z10 each may be a subsequence of a complete sequence. In other words, the complete sequence includes 10 subsequences, and the four subsequences may form the complete sequence. In other words, the sequences Z1, Z2, Z3, Z4, . . . , and Z10 form the complete sequence. It should be noted that the complete sequence herein may be a ZC sequence, or may be various sequences transformed from the ZC sequence. Details are not described herein. It may be understood that the sequence in FIG. 5d is not limited to the ZC sequence. This is not limited in this embodiment of the present invention.

S11. The network device sends the first signal.

In an embodiment, the network device sends the first signal to a terminal device. Optionally, the first signal may be used to indicate whether the terminal device has paging scheduling information associated with the terminal device; and/or the first signal may be used to indicate whether there is downlink control information, such as PDCCH scheduling information, associated with the terminal device within a specific time such as a discontinuous reception cycle (DRX cycle); and/or the first signal may be used to indicate whether a system message of a cell serving the terminal device changes; and/or the first signal may be used to indicate a cell identifier of a cell serving the terminal device.

Optionally, if the first sequence corresponding to the other sequence in one sequence pair is a complete sequence, the terminal device may be indicated according to an order of first sequences corresponding to the other sequences in a plurality of sequence pairs in the first signal. For specific indication information, refer to the foregoing description, for example, indicating whether there is the paging scheduling information associated with the terminal device, and/or indicating the cell identifier of the cell serving the terminal device. It should be noted that, when the cell identifier of the cell serving the terminal device is indicated according to the order, in the first signal, of the first sequence corresponding to the other sequence in each of the at least one sequence pair, that different orders of all first sequences are corresponding to different cell identifiers needs to be preset. In this way, the terminal device may determine the cell identifier of the cell serving the terminal device.

Optionally, if the first sequence corresponding to the other sequence in one sequence pair is a subsequence of the second sequence, first sequences corresponding to the other sequences in all of the at least one sequence pair form the second sequence. The terminal device may be indicated by using different formed second sequences. For specific indication information, refer to the foregoing description, for example, indicating whether there is the paging scheduling information associated with the terminal device, and/or indicating the cell identifier of the cell serving the terminal device. Optionally, if the second sequence is a ZC sequence or various sequences transformed from the ZC sequence, different ZC sequences have different root indexes.

S12. The terminal device receives the first signal.

It should be specially emphasized that the first signal received by the terminal device may be a signal obtained after the first signal sent by the network device is affected by undesirable factors such as a channel, noise, and a carrier frequency offset (frequency offset for short). The undesirable factors such as the channel, the noise, the carrier frequency offset (frequency offset for short) may cause a continuous phase change of the first signal in time domain. This is not limited in this embodiment of the present invention.

S13. The terminal device calculates, according to a target calculation rule, the element value of the one sequence of the two sequences included in the first signal and the element value of the other sequence of the two sequences, to obtain a third sequence corresponding to the other sequence.

In an embodiment, the terminal device performs following processing on two sequences in any sequence pair in the received first signal according to the target calculation rule: calculating the element value of the one sequence of the two sequences and the element value of the other sequence, to obtain the third sequence corresponding to the other sequence. It should be noted that, if there is no impact of the undesirable factors such as the channel, the noise, and the carrier frequency offset (frequency offset for short), the third sequence is the same as the first sequence. Because there is impact of the undesirable factors such as the channel, the noise, and the carrier frequency offset (frequency offset for short), the third sequence may be a sequence obtained after the first sequence is affected by the undesirable factors such as the channel, the noise, and the carrier frequency offset (frequency offset for short).

Optionally, the target calculation rule needs to be determined based on the first calculation rule in step S10. For example, the first calculation rule includes at least one of the multiplication rule, the conjugate multiplication rule, the division rule, and the conjugate division rule. The target calculation rule may be the conjugate multiplication rule. For example, a conjugate sequence of the other sequence of the two sequences is multiplied by the one sequence of the two sequences, to obtain the third sequence corresponding to the other sequence. It should be understood that the one sequence of the two sequences may be divided by the other sequence. Alternatively, the terminal device may multiply a conjugate sequence of the one sequence of the two sequences by the other sequence, to obtain the third sequence. The third sequence retains a characteristic of the first sequence.

For example, in step S10, if the one sequence in the one sequence pair obtained by performing processing according to the first calculation rule is Z1×Z2, and the other sequence is Z1, when the target calculation rule is used for processing, a calculation rule may be Z1-×(Z1×Z2), and finally a sequence Z2 is obtained. Because there is impact of the undesirable factors such as the channel, the noise, and the carrier frequency offset (frequency offset for short), the third sequence is a sequence obtained after the sequence Z2 is affected by the undesirable factors such as the channel, the noise, and the carrier frequency offset (frequency offset for short). For example, a fixed phase difference exists between the third sequence and the sequence Z2, and the third sequence still retains a characteristic of the sequence Z2. For example, the sequence Z2 is a ZC sequence, and the third sequence still has a good autocorrelation characteristic.

S14. The terminal device obtains a timing position by using the first sequence and the third sequence.

In an embodiment, the terminal device obtains the timing position by using the first sequence and the third sequence that are stored locally. Optionally, the terminal device performs a convolution operation or a circular convolution operation on the first sequence and the third sequence that are stored locally, to obtain the timing position.

Optionally, the first sequence may be a complete sequence. In this case, the third sequence obtained after the terminal device performs processing according to the target calculation rule is also a complete sequence. The first signal includes a plurality of sequence pairs, and a plurality of complete sequences may be obtained. For example, if the first sequence is a ZC sequence, the terminal device may obtain a plurality of short ZC sequences.

When performing correlation processing, the terminal device performs correlation processing on the plurality of short ZC sequences obtained through processing and a plurality of locally stored corresponding ZC sequences, to determine the timing position.

Figure 6A:
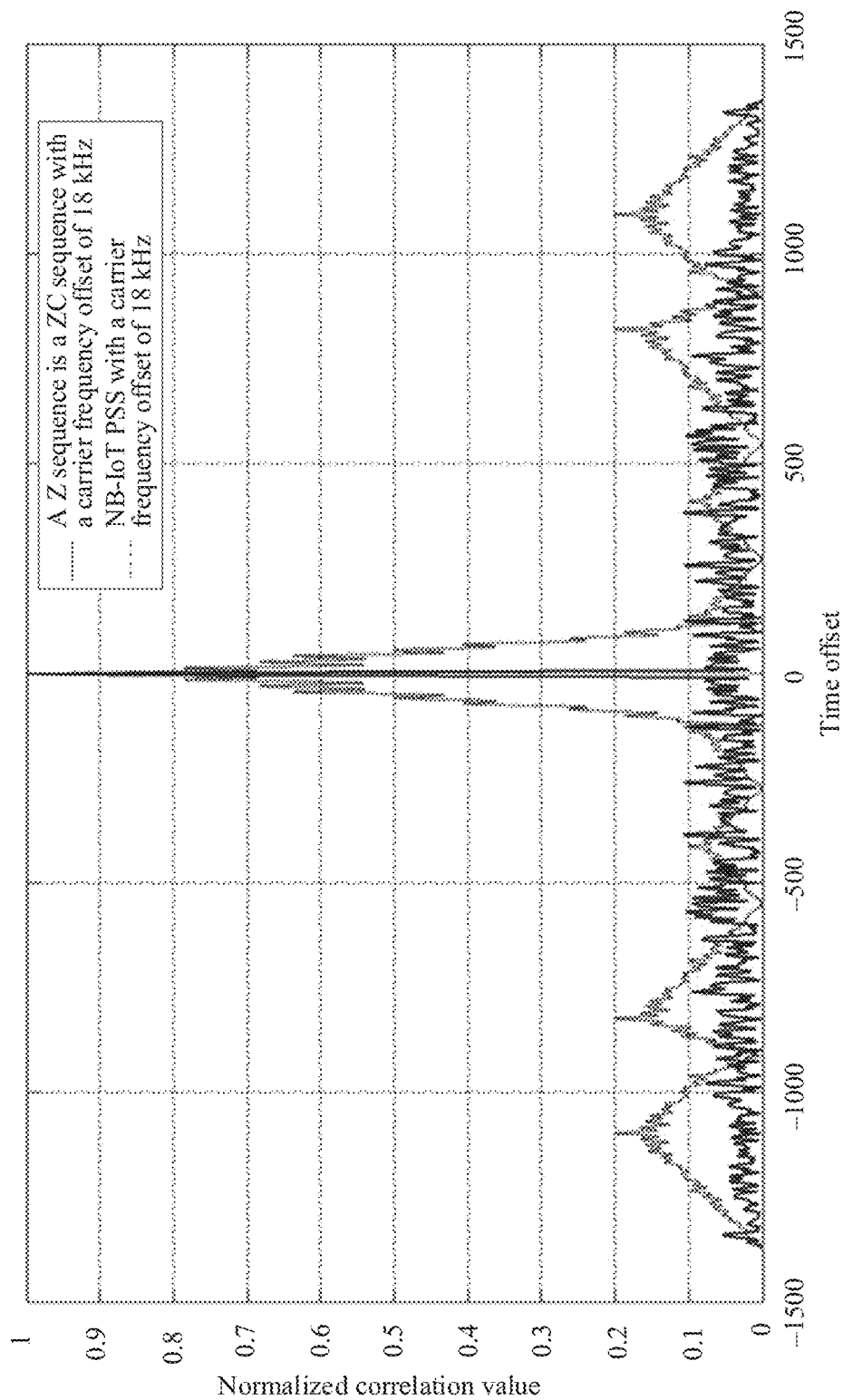
FIG. 6a is a simulation diagram according to an embodiment of the present invention.

For example, if the sequence design manner shown in FIG. 5a is used, the sequences Z1, Z2, Z3, Z4, . . . , and Zn-1 each are a ZC sequence. In this case, when the terminal device performs correlation processing, a simulation diagram of correlation is shown in FIG. 6a. It can be learned from FIG. 6a that a correlation peak of a simulation curve corresponding to the sequence design manner in FIG. 5a is more obvious than that of a simulation curve corresponding to the sequence design manner in NB-IoT in FIG. 3a. Therefore, it is favorable to determine the timing position by the terminal device. It should be noted that a sequence Z in FIG. 6a is a sequence of the foregoing sequences Z1, Z2, Z3, Z4, . . . , and Zn-1.

Optionally, the first sequence may be a subsequence of complete sequence (for example, the second sequence). In this case, the third sequence obtained after the terminal device performs processing according to the target calculation rule is also a subsequence of the fourth sequence. The first signal includes a plurality of sequence pairs. A plurality of third sequences may be obtained by processing two sequences in each of the sequence pairs. The plurality of third sequences are subsequences of the fourth sequence, and the plurality of third sequences form the fourth sequence.

When performing correlation processing, the terminal device performs correlation processing on the obtained fourth sequence and the locally stored second sequence, to determine the timing position.

Figure 6B:
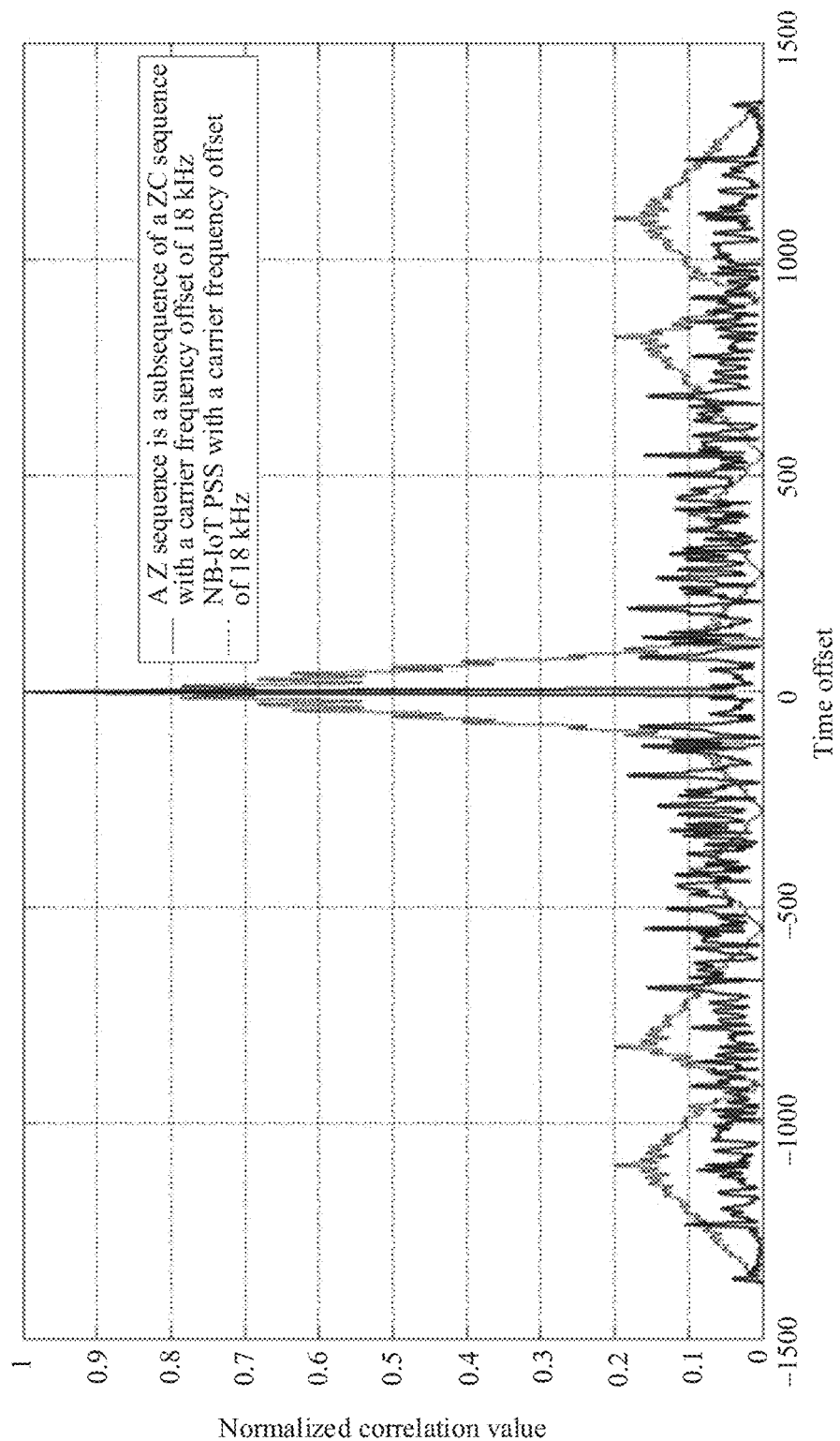
FIG. 6b is another simulation diagram according to an embodiment of the present invention.

For example, if the sequence design manner shown in FIG. 5a is used, the sequences Z1, Z2, Z3, Z4, . . . , and Zn-1 each are a subsequence of a ZC sequence. In other words, Z1, Z2, Z3, Z4, . . . , and Zn-1 form the ZC sequence. When the terminal device performs correlation processing, a simulation diagram of correlation is shown in FIG. 6b. It can be learned from FIG. 6b that a correlation peak of a simulation curve corresponding to the sequence design manner in FIG. 5a is more obvious than that of a simulation curve corresponding to the sequence design manner in NB-IoT in FIG. 3a. Therefore, it is favorable to determine the timing position by the terminal device. In addition, because a finally obtained ZC sequence is comparatively long, the correlation peak of the simulation curve in the correlation simulation diagram is more obvious than that in FIG. 6a. It should be noted that a sequence Z in FIG. 6b is a sequence of the foregoing sequences Z1, Z2, Z3, Z4, . . . , and Zn-1.

Optionally, the first signal may be used to indicate whether there is paging scheduling information associated with the terminal device; and/or whether there is downlink control information, such as PDCCH scheduling information, associated with the terminal device within a specific time such as a discontinuous reception cycle (DRX cycle); and/or whether a system message of a cell serving the terminal device changes; and/or a cell identifier of a cell serving the terminal device.

If the terminal device determines, by using the first signal, that there is the paging scheduling information associated with the terminal device, the terminal device may listen to paging scheduling information at a PO. If the terminal device determines, by using the first signal, that there is no paging scheduling information associated with the terminal device, the terminal device may not listen to information, to reduce power consumption.

Optionally, the terminal device may determine, by using the first information, the cell identifier of the cell serving the terminal device, so as to further perform downlink measurement by using the signal.

In this embodiment of the present invention, the first signal includes at least one sequence pair, each sequence pair includes two sequences, and the element value of the one sequence of the two sequences is the value obtained by calculating, according to the first calculation rule, the element value of the other sequence of the two sequences and the element value of the first sequence corresponding to the other sequence. Because the foregoing relationship exists between the two sequences in the one sequence pair, the terminal device may perform calculation processing on the one sequence and the other sequence in the sequence pair according to the target calculation rule when receiving the signal affected by the undesirable factors such as the channel, the noise, and the carrier frequency offset (frequency offset for short), thereby eliminating impact of the frequency offset and improving anti-frequency offset performance. In addition, the fourth sequence may still be obtained after the frequency offset is eliminated, and the fourth sequence retains the characteristic of the first sequence, thereby helping the terminal device accurately determine the timing position.

Figure 7A:
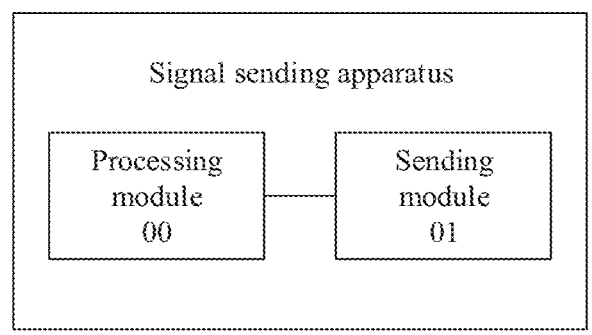
FIG. 7a is a schematic structural diagram of a signal sending apparatus according to an embodiment of the present invention.

According to the foregoing method, FIG. 7a is a schematic diagram of a signal sending apparatus according to an embodiment of this application. As shown in FIG. 7a, the signal sending apparatus may be a network device 10, or may be a chip or a circuit, for example, a chip or a circuit that may be disposed in a network device. The network device 10 is corresponding to the network device in the foregoing methods. As shown in FIG. 7a, the signal sending apparatus may include a processing module 00 and a sending module 01.

The processing module 00 may be configured to perform corresponding processing described in the foregoing method on a first signal to be sent by the sending module 01, and send the first signal by using the sending module 01.

Figure 7B:
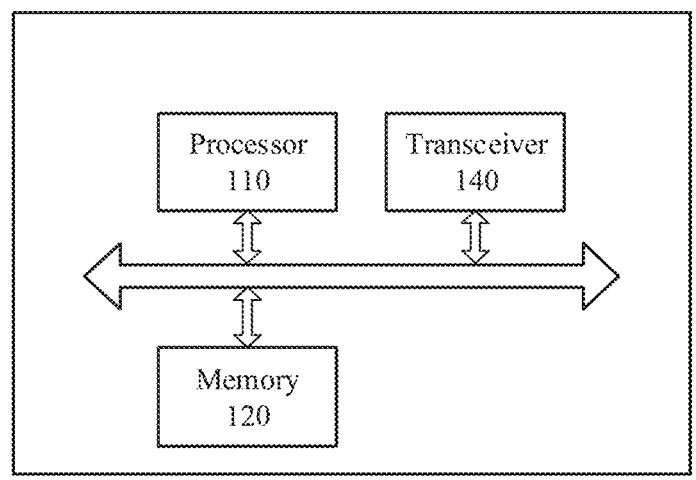
FIG. 7b is a schematic structural diagram of another signal sending apparatus according to an embodiment of the present invention.

The sending module 01 may be implemented by using a transceiver 140 in FIG. 7b. The processing module 00 may be implemented by using a processor 110, or may be implemented by using a processor 110 and a memory 120.

For details, refer to the descriptions in the foregoing method. Details are not described herein again.

The processing module 00 is configured to generate a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1.

The sending module 01 is configured to send the first signal generated by the processing module to a terminal device.

In an example, the first sequence corresponding to the other sequence is a subsequence of a second sequence.

In an example, the first calculation rule includes at least one of a multiplication rule, a conjugate multiplication rule, a division rule, and a conjugate division rule.

In an example, the other sequence is a sequence obtained by calculating N sequences according to a second calculation rule, and N is a natural number greater than or equal to 2.

In an example, the one sequence and the other sequence of the two sequences in the sequence pair are sequences carried in adjacent time domain symbols.

In an example, the first signal is used to indicate whether the terminal device has paging scheduling information associated with the terminal device, and/or the first signal is used to indicate a cell identifier of a cell serving the terminal device.

FIG. 7b is a schematic structural diagram of another signal sending apparatus according to an embodiment of the present invention. As shown in the figure, the signal sending apparatus may include a processor 110 and a memory 120. The memory 120 is configured to store an instruction. The processor 110 is configured to execute the instruction stored in the memory 120, to enable the signal sending apparatus to implement the corresponding method on the network device side in FIG. 4.

Further, the signal sending apparatus may further include a transceiver 140. The processor 110 is configured to execute the instruction stored in the memory 120, to control the transceiver 140 to receive a signal, or control the transceiver 140 to send a signal, to complete the steps on the network device side in the foregoing method. The transceiver 140 may include a receiver and a transmitter. The receiver and the transmitter may be a same physical entity or different physical entities. When the receiver and the transmitter are a same physical entity, the receiver and the transmitter may be collectively referred to as the transceiver 140. The memory 120 may be integrated into the processor 110, or may be separated from the processor 110.

In an implementation, it may be considered that a function of the transceiver 240 is implemented by using a transceiver circuit or a transceiver-dedicated chip. The processor 210 may be implemented by using a dedicated processing chip, a processing circuit, or a processor, or a general-purpose chip.

In another implementation, it may be considered that the network device provided in this embodiment of this application is implemented by using a general-purpose computer. To be specific, program code that is used to implement functions of the processor 210, the receiver 240, and the transmitter 250 is stored in the memory. A general purpose processor implements the functions of the processor 210, the receiver 240, and the transmitter 250 by executing the code in the memory.

For concepts, explanations, detailed descriptions, and other steps related to the signal sending apparatus and the technical solution provided in this embodiment of this application, refer to the descriptions of the content in the foregoing method or other embodiments. Details are not described herein again.

Figure 7C:
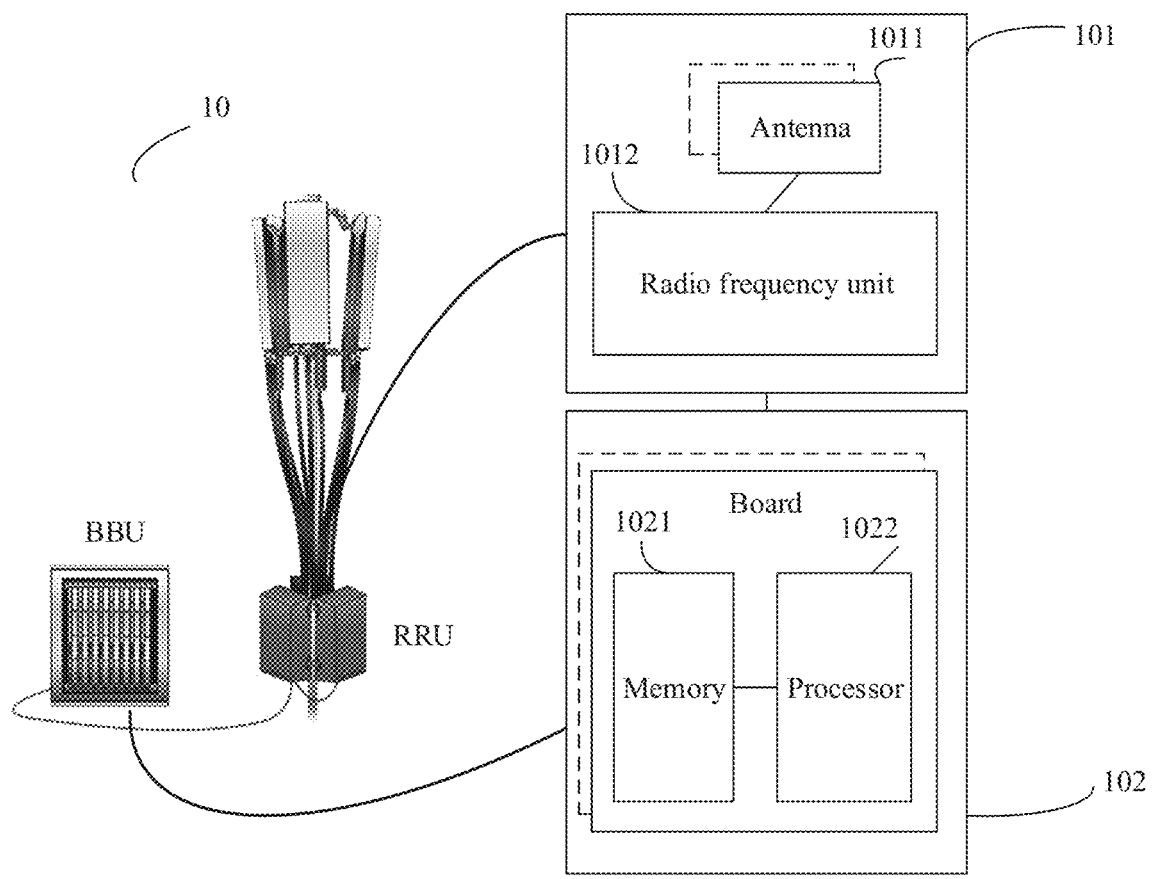
FIG. 7c is a schematic structural diagram of a terminal device according to an embodiment of the present invention.

FIG. 7c is a schematic structural diagram of a network device according to an embodiment of this application. For example, FIG. 7c may be a schematic structural diagram of a base station. As shown in FIG. 7c, the base station may be applied to the system shown in FIG. 2. The base station 10 includes one or more radio frequency units such as a remote radio unit (remote radio unit, RRU) 101 and one or more baseband units (baseband unit, BBU) (also referred to as a digital unit (digital unit, DU)) 102. The RRU 101 may be referred to as a transceiver unit, a transceiver, a transceiver circuit, a transceiver, or the like, and may include at least one antenna 1011 and a radio frequency unit 1012. The RRU 101 is mainly configured to send and/or receive a radio frequency signal and perform conversion between a radio frequency signal and a baseband signal, for example, configured to send the first signal in the foregoing embodiments to a terminal device. The BBU 102 is mainly configured to perform baseband processing, control the base station, and the like. The RRU 101 and the BBU 102 may be physically disposed together, or may be physically separated, namely, a distributed base station.

The BBU 102 is a control center of the base station, or may be referred to as a processing unit or a processing module, and is mainly configured to complete baseband processing functions such as channel coding, multiplexing, modulation, and spectrum spreading. For example, the BBU (the processing unit) may be configured to control the base station to perform an operation procedure of the network device in the foregoing method embodiments.

In an example, the BBU 102 may include one or more boards, and a plurality of boards may jointly support a radio access network (such as an LTE network) of a single access standard, or may separately support radio access networks of different access standards. The BBU 102 further includes a memory 1021 and a processor 1022. The memory 1021 is configured to store a necessary sequence. For example, the memory 1021 stores the sequence used to generate the first signal in the foregoing embodiments. The processor 1022 is configured to control the base station to perform a necessary action, for example, is configured to control the base station to perform an operation procedure related to the network device in the foregoing method embodiments. The memory 1021 and the processor 1022 may serve the one or more boards. In other words, a memory and a processor may be disposed on each board, or the plurality of boards may share a same memory and a same processor. In addition, each board may further be provided with a necessary circuit.

Figure 8A:
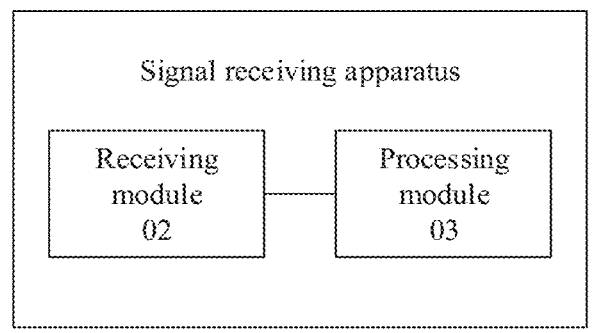
FIG. 8a is a schematic structural diagram of a signal receiving apparatus according to an embodiment of the present invention.
Figure 8B:
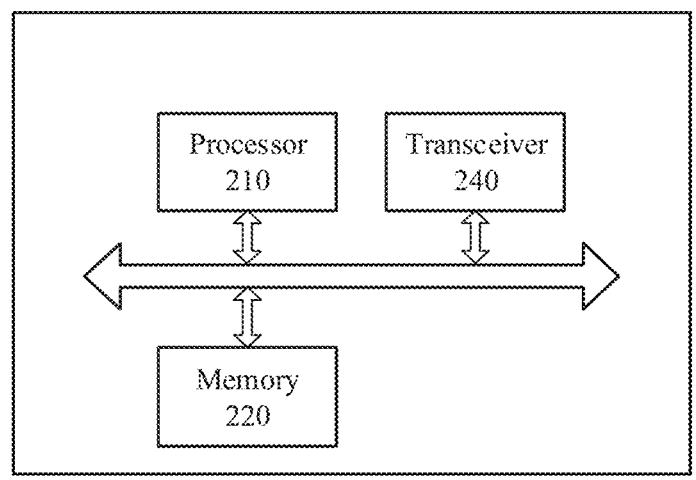
FIG. 8b is a schematic structural diagram of a signal receiving apparatus according to an embodiment of the present invention.

FIG. 8a is a schematic structural diagram of a signal receiving apparatus according to an embodiment of the present invention. The signal receiving apparatus may be a terminal device, or may be a chip or a circuit, for example, a chip or a circuit that may be disposed in a terminal device. The terminal device may be corresponding to the terminal device in the foregoing method. As shown in FIG. 8a, the device may include a receiving module 02 and a processing module 03.

The receiving module 02 may be configured to receive a first signal sent by a network device. The processing module 03 may be configured to perform corresponding processing described in the foregoing method on the first signal received by the receiving module 02.

The receiving module 02 may be implemented by using a transceiver 240 in FIG. 5b. The processing module 03 may be implemented by using a processor 210, or may be implemented by using a processor 210 and a memory 220.

For details, refer to the descriptions in the foregoing method. Details are not described herein again.

For example, the receiving module 02 is configured to receive a first signal, where the first signal includes at least one sequence pair, each of the at least one sequence pair includes two sequences, and an element value of one sequence of the two sequences is a value obtained by calculating, according to a first calculation rule, an element value of the other sequence of the two sequences and an element value of a first sequence corresponding to the other sequence, where each sequence in the at least one sequence pair and the first sequence are complex sequences with lengths greater than 1.

The processing module 03 is configured to calculate, according to a target calculation rule, the element value of the one sequence of the two sequences received by the receiving module 02 and the element value of the other sequence of the two sequences, to obtain a third sequence corresponding to the other sequence, and obtain a timing position by using the first sequence and the third sequence.

FIG. 5b is a schematic structural diagram of another signal receiving apparatus according to an embodiment of the present invention. As shown in the figure, the signal receiving apparatus may include a processor 210 and a memory 220. The memory 220 is configured to store an instruction. The processor 210 is configured to execute the instruction stored in the memory 220, to implement the steps in the corresponding method on the terminal device side in FIG. 4.

Further, the signal receiving apparatus may further include a transceiver 240. Further, the processor 210 is configured to execute the instruction stored in the memory 220, to control the transceiver 240 to receive a signal, or control the transceiver 240 to send a signal, to complete the steps on the terminal device side in the foregoing method. The transceiver 240 may include a receiver and a transmitter. The receiver and the transmitter may be a same physical entity or different physical entities. When the receiver 240 and the transmitter 250 are a same physical entity, the receiver and the transmitter may be collectively referred to as the transceiver 240. The memory 220 may be integrated into the processor 210, or may be separated from the processor 210.

In an implementation, it may be considered that a function of the transceiver 240 is implemented by using a transceiver circuit or a transceiver-dedicated chip. The processor 210 may be implemented by using a dedicated processing chip, a processing circuit, or a processor, or a general-purpose chip.

In another implementation, it may be considered that the terminal device provided in this embodiment of this application is implemented by using a general-purpose computer. To be specific, program code that is used to implement functions of the processor 210, and the transceiver is stored in the memory. A general purpose processor implements the functions of the processor 210, the transceiver 240 by executing the code in the memory.

For concepts, explanations, detailed descriptions, and other steps related to the signal receiving apparatus and the technical solution provided in this embodiment of this application, refer to the descriptions of the content in the foregoing method or other embodiments. Details are not described herein again.

Figure 8C:
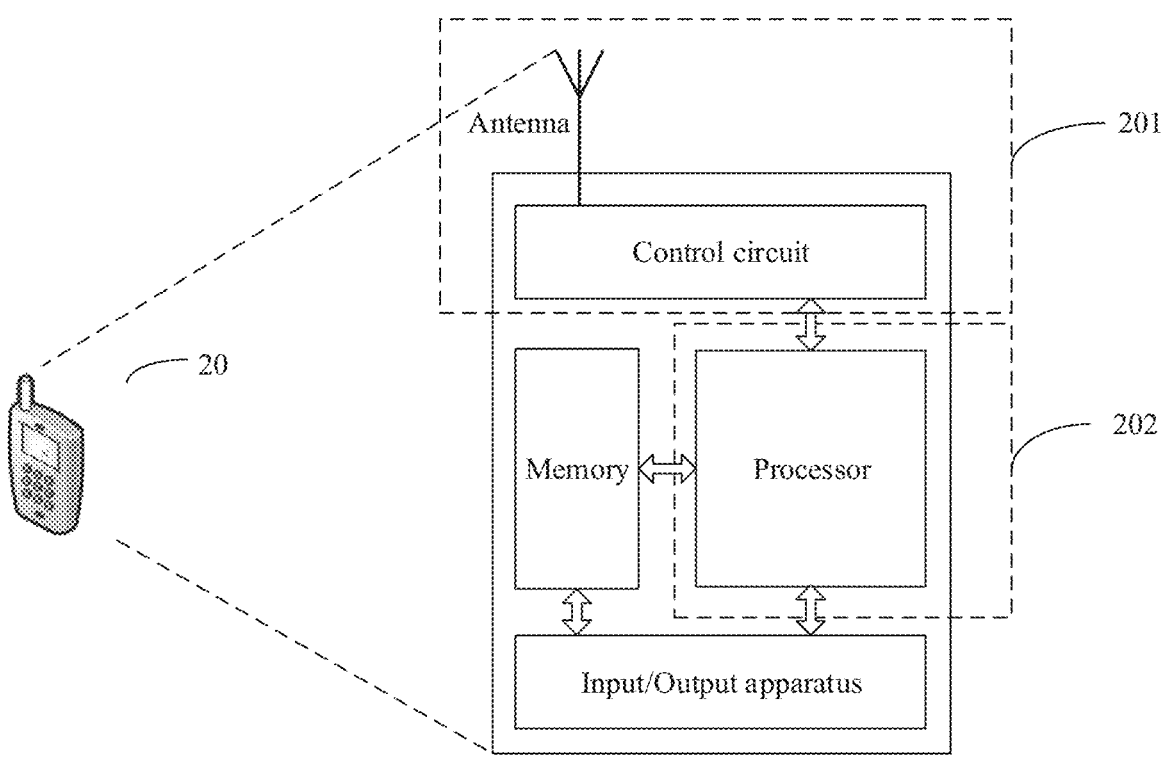
FIG. 8c is a schematic structural diagram of a network device according to an embodiment of the present invention.

FIG. 8c is a schematic structural diagram of a terminal device according to this application. The terminal device is applicable to the system shown in FIG. 2. For ease of description, FIG. 8c only shows main components of the terminal device. As shown in FIG. 8c, the terminal device 10 includes a processor, a memory, a control circuit, an antenna, and an input/output apparatus. The processor is mainly configured to: process a received signal, control the entire terminal device, execute a software program, and process data of the software program. For example, the processor is configured to support the terminal device in performing an action described in the embodiment of the foregoing signal receiving method. The memory is mainly configured to store a software program and data, for example, store the sequence described in the foregoing embodiment. The control circuit is mainly configured to perform conversion between a baseband signal and a radio frequency signal and process the radio frequency signal. The control circuit, together with an antenna, may also be referred to as a transceiver that is mainly configured to send and/or receive a radio frequency signal in an electromagnetic wave form. The input/output apparatus, such as a touchscreen, a display, or a keyboard, is mainly configured to receive data input by a user and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 8c only shows one memory and one processor. Actually, the terminal device may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communications protocol and communication data. The central processing unit is mainly configured to: control the entire terminal device, execute a software program, and process data of the software program. The processor in FIG. 8c integrates functions of the baseband processor and the central processing unit. A person skilled in the art may understand that the baseband processor and the central processing unit may alternatively be processors independent of each other. A person skilled in the art may understand that the terminal device may include a plurality of baseband processors to adapt to different network standards, and the terminal device may include a plurality of central processing units to enhance a processing capability of the terminal device. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

For example, in this embodiment of the present invention, an antenna having a transceiver function and a control circuit may be considered as a receiving module 201 of the terminal device 20, and a processor having a processing function may be considered as a processing module 202 of the terminal device 20.

According to the method provided in the embodiments of this application, an embodiment of this application further provides a communications system. The system includes the foregoing network device and at least one the foregoing terminal device.

It should be understood that in the embodiment of this application, the processor may be a central processing unit (Central Processing Unit, CPU), or the processor 610 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be further understood that first, second, third, fourth, and various numbers in this specification are merely used for differentiation for ease of description, and are not intended to limit the scope of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal sending method, comprising:
generating, by a network device, a first signal, wherein the first signal comprises at least one sequence pair, each of the at least one sequence pair comprises two sequences, and an element value of one sequence of the two sequences is a value obtained by multiplying or dividing an element value of the other sequence of the two sequences and an element value of a first sequence corresponding to the other sequence, wherein the first sequence is different than the other sequence, wherein each sequence in the at least one sequence pair and the first sequence are complex sequences with lengths greater than 1; and
sending, by the network device, the first signal to a terminal device.

2. The method according to claim 1, wherein the first sequence corresponding to the other sequence is a subsequence of a second sequence.

3. The method according to claim 1, wherein the other sequence is a sequence obtained by calculating N sequences according to a second calculation rule, and N is a natural number greater than or equal to 2.

4. The method according to claim 1, wherein the one sequence and the other sequence of the two sequences in the sequence pair are sequences carried in adjacent time domain symbols.

5. The method according to claim 1, wherein the first signal indicates whether the terminal device has paging scheduling information associated with the terminal device, or the first signal indicates a cell identifier of a cell serving the terminal device.

6. A signal receiving method, comprising:
receiving, by a terminal device, a first signal, wherein the first signal comprises at least one sequence pair, each of the at least one sequence pair comprises two sequences, and an element value of one sequence of the two sequences is a value obtained by multiplying or dividing an element value of the other sequence of the two sequences and an element value of a first sequence corresponding to the other sequence, wherein the first sequence is different than the other sequence, wherein each sequence in the at least one sequence pair and the first sequence are complex sequences with lengths greater than 1;
calculating, by the terminal device, the element value of the one sequence of the two sequences and the element value of the other sequence of the two sequences according to a target calculation rule, to obtain a third sequence corresponding to the other sequence; and
obtaining, by the terminal device, a timing position by using the first sequence and the third sequence.

7. The method according to claim 6, wherein
the calculating, by the terminal device, the element value of the one sequence of the two sequences and the element value of the other sequence of the two sequences according to a target calculation rule, to obtain a third sequence corresponding to the other sequence comprises:
multiplying, by the terminal device, a conjugate sequence of the other sequence of the two sequences by the one sequence of the two sequences, to obtain the third sequence corresponding to the other sequence, and an element value of the conjugate sequence of the other sequence is a conjugate complex number of the element value of the other sequence.

8. The method according to claim 6, wherein the obtaining, by the terminal device, a timing position by using the first sequence and the third sequence comprises:
performing, by the terminal device, a convolution operation or a circular convolution operation on the first sequence and the third sequence, and determining the timing position based on an operation result.

9. The method according to claim 6, wherein the first sequence corresponding to the other sequence is a subsequence of a second sequence; and the obtaining, by the terminal device, a timing position by using the first sequence and the third sequence comprises:

obtaining, by the terminal device, a fourth sequence, wherein the fourth sequence is a sequence comprising the third sequence corresponding to the other sequence in each of the at least one sequence pair; and performing, by the terminal device, a convolution operation or a circular convolution operation on the second sequence and the fourth sequence, and determining the timing position based on an operation result.

10. A signal sending apparatus, comprising:
a processor, configured to generate a first signal, wherein the first signal comprises at least one sequence pair, each of the at least one sequence pair comprises two sequences, and an element value of one sequence of the two sequences is a value obtained by multiplying or dividing an element value of the other sequence of the two sequences and an element value of a first sequence corresponding to the other sequence, wherein the first sequence is different than the other sequence, wherein each sequence in the at least one sequence pair and the first sequence are complex sequences with lengths greater than 1; and
a transmitter, configured to send the first signal generated by the processor to a terminal device.

11. The apparatus according to claim 10, wherein the first sequence corresponding to the other sequence is a subsequence of a second sequence.

12. The apparatus according to claim 10, wherein the other sequence is a sequence obtained by calculating N sequences according to a second calculation rule, and N is a natural number greater than or equal to 2.

13. The apparatus according to claim 10, wherein the one sequence and the other sequence of the two sequences in the sequence pair are sequences carried in adjacent time domain symbols.

14. The apparatus according to claim 10, wherein the first signal indicates whether the terminal device has paging scheduling information associated with the terminal device, or the first signal indicates a cell identifier of a cell serving the terminal device.

15. A signal receiving apparatus, comprising:
a receiver, configured to receive a first signal, wherein the first signal comprises at least one sequence pair, each of the at least one sequence pair comprises two sequences, and an element value of one sequence of the two sequences is a value obtained by multiplying or dividing an element value of the other sequence of the two sequences and an element value of a first sequence corresponding to the other sequence, wherein the first sequence is different than the other sequence, wherein each sequence in the at least one sequence pair and the first sequence are complex sequences with lengths greater than 1; and
a processor, configured to calculate, according to a target calculation rule, the element value of the one sequence of the two sequences received by the receiver and the element value of the other sequence of the two sequences, to obtain a third sequence corresponding to the other sequence, and obtain a timing position by using the first sequence and the third sequence.

16. The apparatus according to claim 15, wherein the processor is configured to: multiply a conjugate sequence of the other sequence of the two sequences by the one sequence of the two sequences, to obtain the third sequence corresponding to the other sequence, and an element value of the conjugate sequence of the other sequence is a conjugate complex number of the element value of the other sequence.

17. The apparatus according to claim 15, wherein the processor is configured to:
perform a convolution operation or a circular convolution operation on the first sequence and the third sequence, and determine the timing position based on an operation result.

18. The apparatus according to claim 15, wherein the processor is configured to: when the first sequence corresponding to the other sequence is a subsequence of a second sequence, obtain a fourth sequence, wherein the fourth sequence is a sequence comprising the third sequence corresponding to the other sequence in each of the at least one sequence pair; and perform a convolution operation or a circular convolution operation on the second sequence and the fourth sequence, and determine the timing position based on an operation result.

* * * * *